US012662296B2

(12) United States Patent (10) Patent No.: US 12,662,296 B2
Hunt, Jr. et al. (45) Date of Patent: Jun. 23, 2026

(54) CLOSURE SYSTEM FOR COVERING A SURFACE OF AN OBJECT

(71) Applicant: TredWear LLC, Shelby, AL (US)

(72) Inventors: Michael Steven Hunt, Jr., Columbiana, AL (US); Lee Clayton, Columbiana, AL (US)

(73) Assignee: TredWear LLC, Shelby, AL (US)

( * ) Notice: Subject to any disclaimer, the term of this patent is extended or adjusted under 35 U.S.C. 154(b) by 220 days.

(21) Appl. No.: 18/425,164

(22) Filed: Jan. 29, 2024

(65) Prior Publication Data

US 2024/0228138 A1 Jul. 11, 2024

Related U.S. Application Data

(63) Continuation-in-part of application No. 18/315,170, filed on May 10, 2023, now Pat. No. 12,459,712, which is a continuation of application No. 17/010,623, filed on Sep. 2, 2020, now Pat. No. 11,718,459.

(60) Provisional application No. 62/922,856, filed on Sep. 3, 2019.

(51) Int. Cl.
| | |
|---|---|
| *B65D 65/06* | (2006.01) |
| *B25G 1/10* | (2006.01) |
| *A63B 60/14* | (2015.01) |
| *B62K 21/26* | (2006.01) |

(52) U.S. Cl.
CPC .............. *B65D 65/06* (2013.01); *B25G 1/10* (2013.01); *A63B 60/14* (2015.10); *B62K 21/26* (2013.01)

(58) Field of Classification Search
CPC .......... A63B 60/14; B25G 1/10; B62K 21/26; B65D 65/06
See application file for complete search history.

(56) References Cited

U.S. PATENT DOCUMENTS

| | | | |
|---|---|---|---|
| 2,371,566 | A | 3/1945 | Williams |
| 2,659,605 | A | 11/1953 | Le Tourneau |
| 3,851,353 | A | 12/1974 | Wakeman |
| 3,925,136 | A | 12/1975 | Wakeman |
| D278,083 | S | 3/1985 | Meier |
| 4,780,346 | A | 10/1988 | Denoel |
| 5,325,737 | A | 7/1994 | Bendetti |
| 5,867,868 | A | 2/1999 | Ward |
| 5,925,436 | A | 7/1999 | Voss |
| 6,267,836 | B1 | 7/2001 | Fenske et al. |
| 6,641,910 | B1 | 11/2003 | Bries et al. |
| 6,932,727 | B2 | 8/2005 | Kramer |
| 7,329,232 | B2 | 2/2008 | Lipshaw et al. |

(Continued)

*Primary Examiner* — Lawrence D Ferguson
(74) *Attorney, Agent, or Firm* — Harness, Dickey & Pierce, PLC

(57) ABSTRACT

An enclosure for covering an outer surface of an object includes a flexible panel moveable between a first position and a second position. The flexible panel is adapted to be flat in the first position and to at least partially enclose the object in the second position. The flexible panel includes a first panel edge, a second panel edge, and a closure system. The first panel edge is spaced apart from the second panel edge. The closure system includes a plurality of tabs extending from each of the first and the second panel edges. At least one of the plurality of tabs is adapted to simultaneously engage with two other adjacent tabs. In the second position, the closure system interconnects the first and second panel edges.

15 Claims, 26 Drawing Sheets

(56) References Cited

U.S. PATENT DOCUMENTS

| | | | |
|---|---|---|---|
| 8,020,262 B2 | 9/2011 | Oertel | |
| D696,784 S | 12/2013 | Ibrahim et al. | |
| 9,463,569 B1 | 10/2016 | Douglas | |
| 9,587,905 B1 | 3/2017 | Biedenbach et al. | |
| 9,630,077 B2 | 4/2017 | Mikura et al. | |
| D818,550 S | 5/2018 | Griffin, IV | |
| 10,286,269 B2 | 5/2019 | Inoue et al. | |
| 11,192,006 B2 | 12/2021 | Takeuchi | |
| 11,246,764 B2 | 2/2022 | Biddulph et al. | |
| 11,618,880 B2 | 4/2023 | Holzapfel et al. | |
| 11,718,459 B1 | 8/2023 | Hunt, Jr. et al. | |
| 2005/0019252 A1 | 1/2005 | Kohno et al. | |
| 2005/0145515 A1* | 7/2005 | Gelardi | G11B 33/0433 |
| | | | 206/472 |
| 2005/0192524 A1 | 9/2005 | Lipshaw et al. | |
| 2007/0018473 A1 | 1/2007 | Alliger et al. | |
| 2007/0184736 A1 | 8/2007 | Seitz et al. | |
| 2008/0228219 A1 | 9/2008 | Weiser | |
| 2011/0289812 A1 | 12/2011 | Losinger | |
| 2012/0027963 A1 | 2/2012 | Dube et al. | |
| 2012/0279635 A1 | 11/2012 | Masson et al. | |
| 2015/0002542 A1 | 1/2015 | Chan et al. | |
| 2015/0025424 A1 | 1/2015 | Richardson et al. | |
| 2016/0006948 A1 | 1/2016 | Takao | |
| 2016/0069486 A1 | 3/2016 | Roberts et al. | |
| 2016/0347496 A1* | 12/2016 | Carman | B65D 5/4295 |
| 2019/0269214 A1 | 9/2019 | Hunt | |
| 2020/0009547 A1 | 1/2020 | Gerken et al. | |
| 2020/0013964 A1 | 1/2020 | Lee et al. | |
| 2020/0095477 A1 | 3/2020 | Watzke et al. | |
| 2020/0139643 A1 | 5/2020 | Ogale | |
| 2020/0381145 A1 | 12/2020 | Vuylsteke | |

* cited by examiner

Various Shapes can be Employed for the Interlocking Tabs
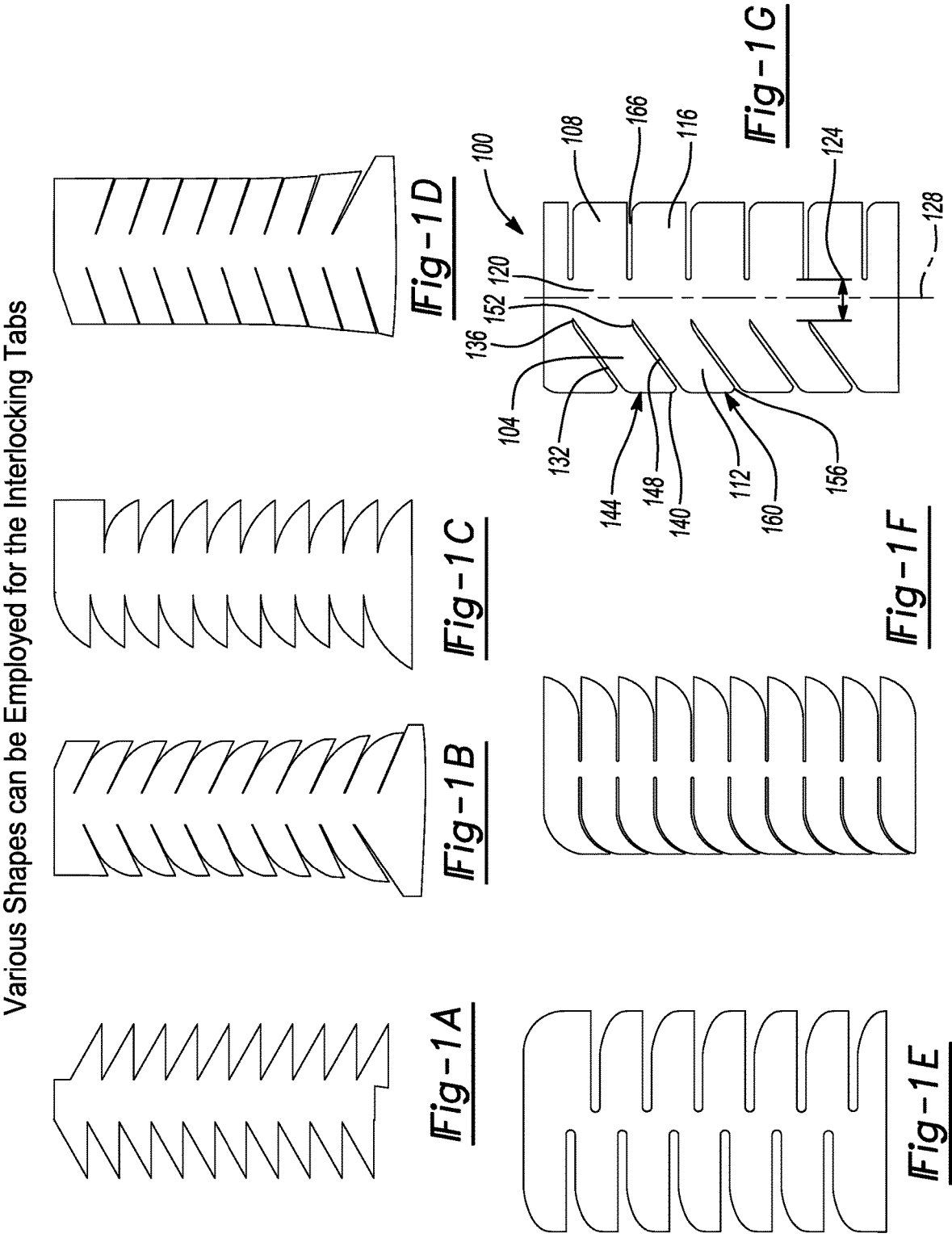

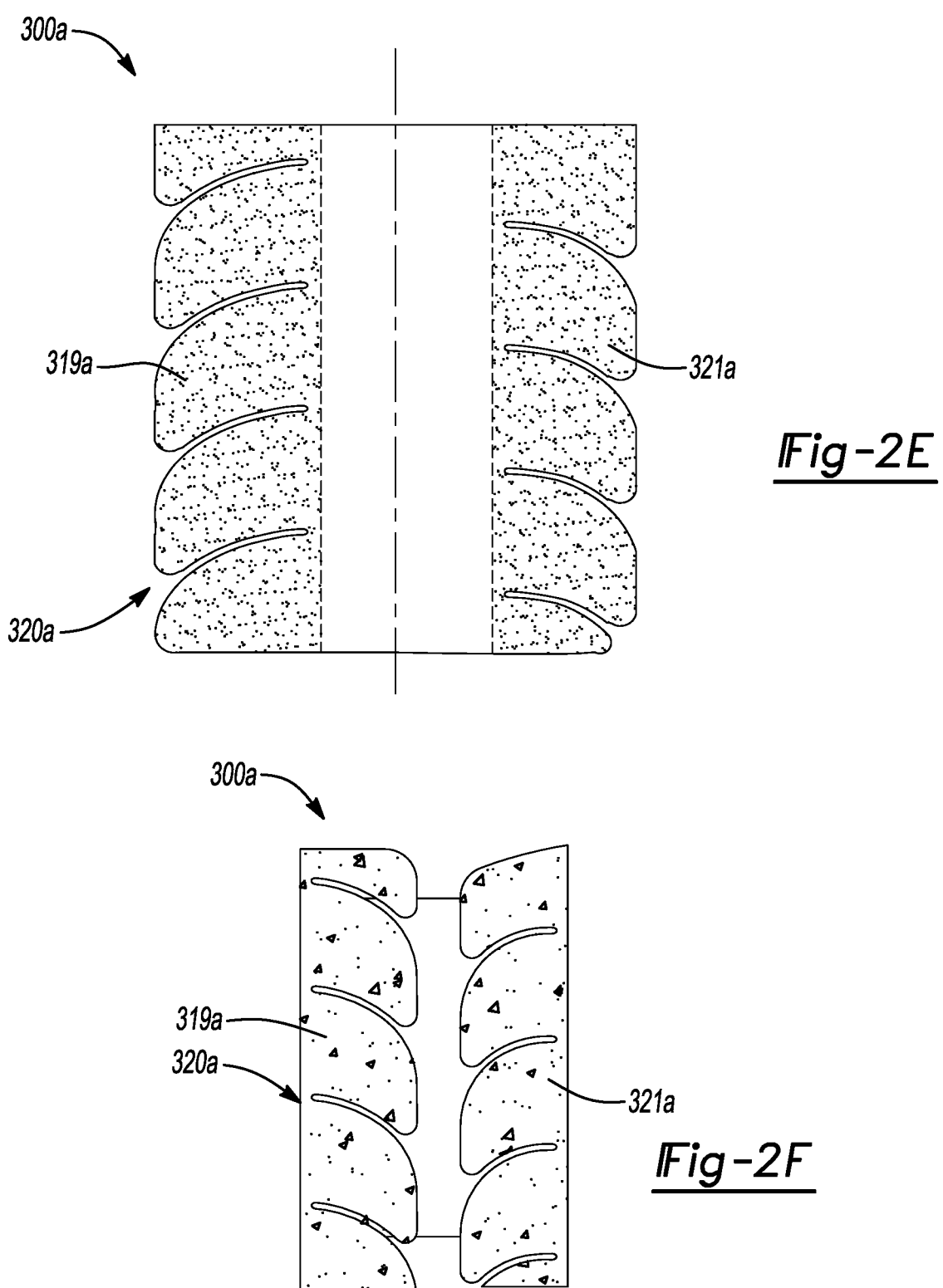
_Fig-2E_
_Fig-2F_

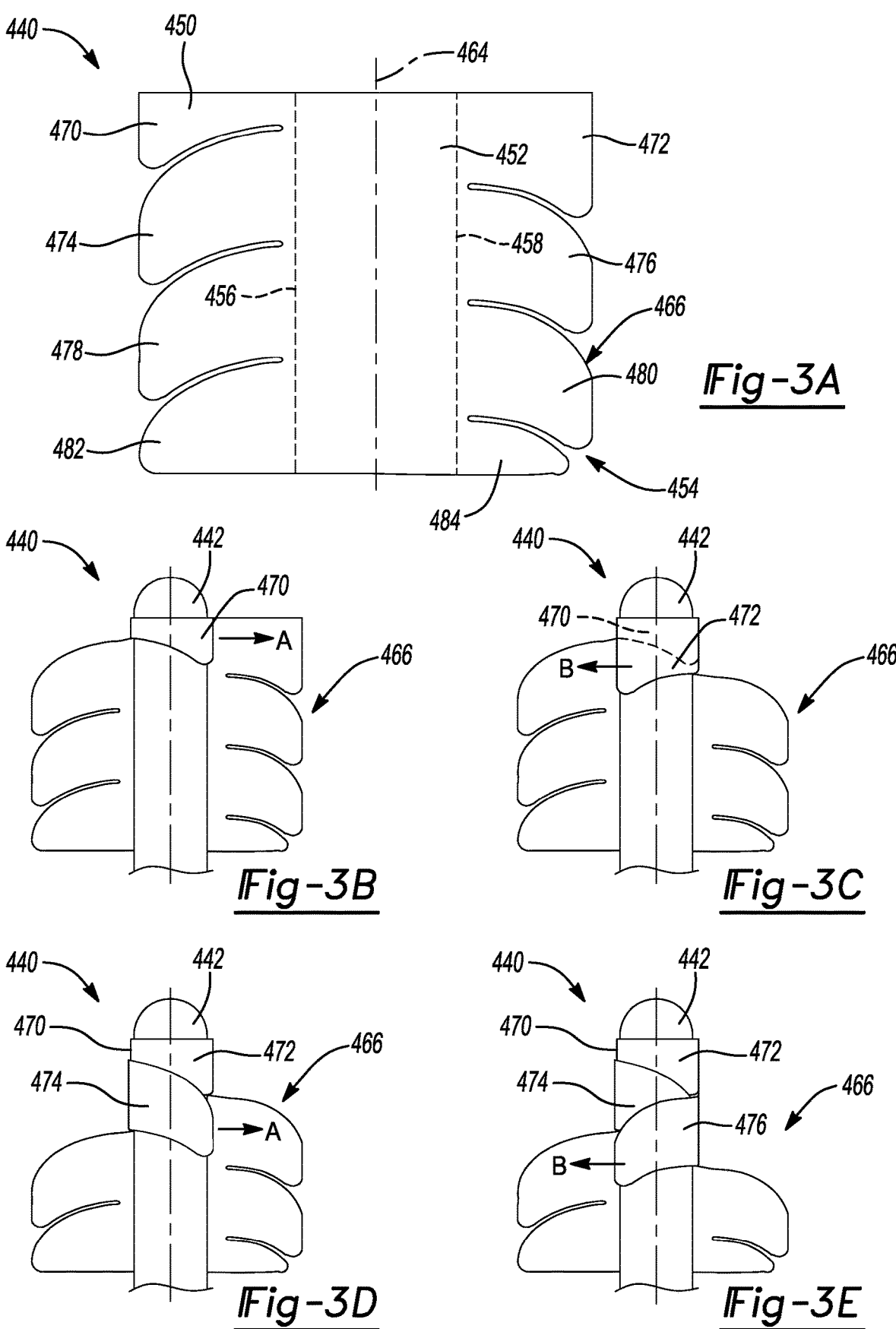
_Fig-3A_
_Fig-3B_
_Fig-3C_
_Fig-3D_
_Fig-3E_

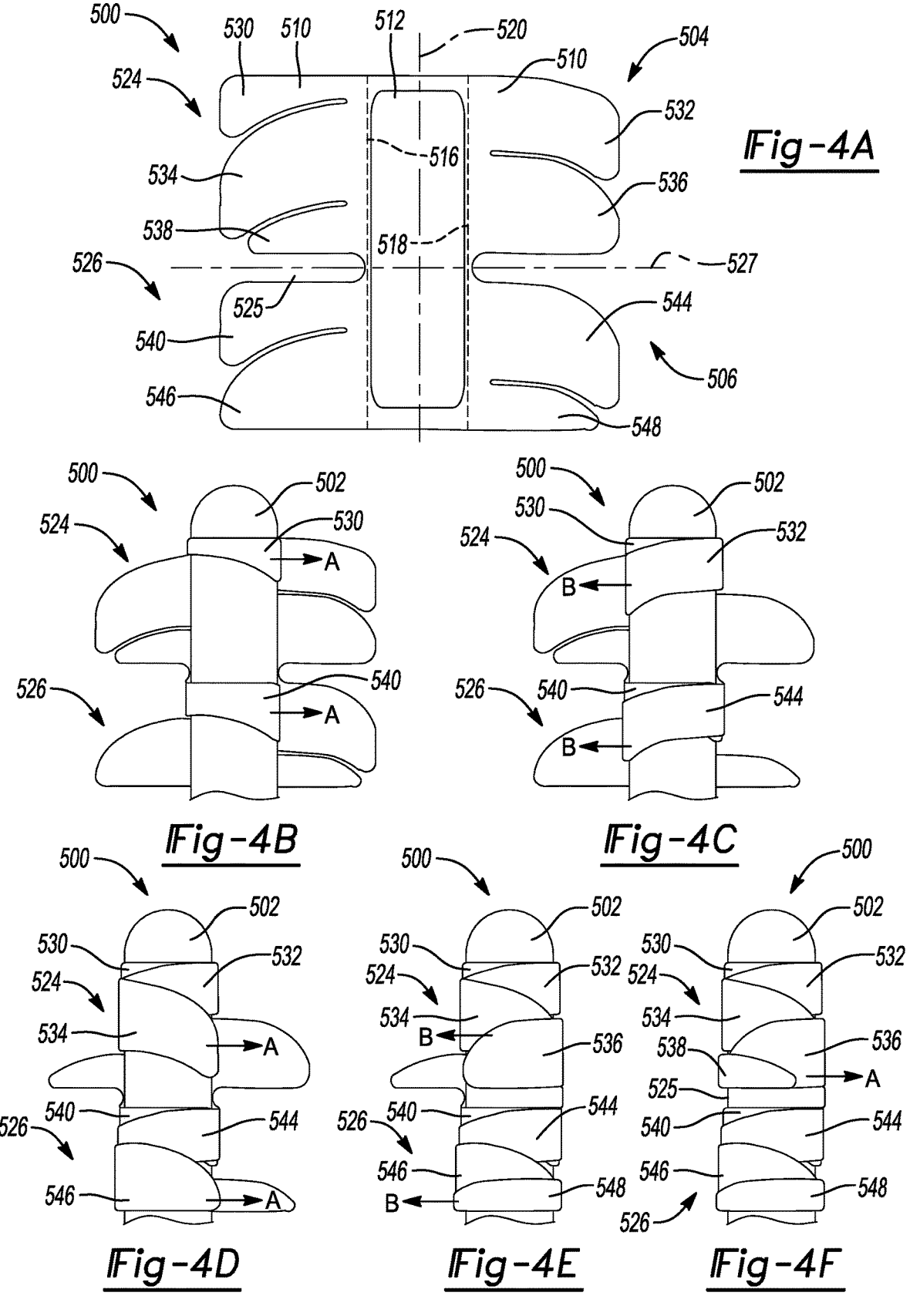
_Fig-4A_
_Fig-4B_
_Fig-4C_
_Fig-4D_
_Fig-4E_
_Fig-4F_

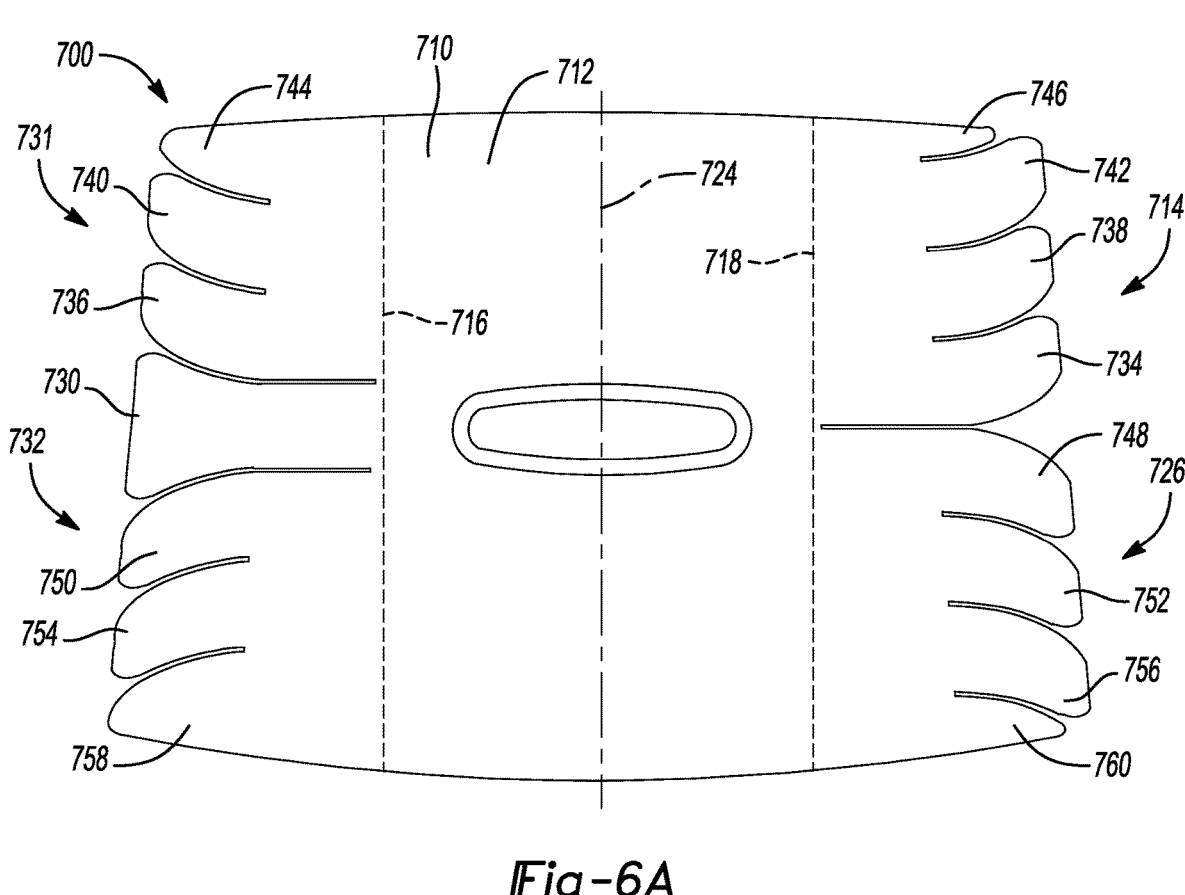
_Fig-6A_
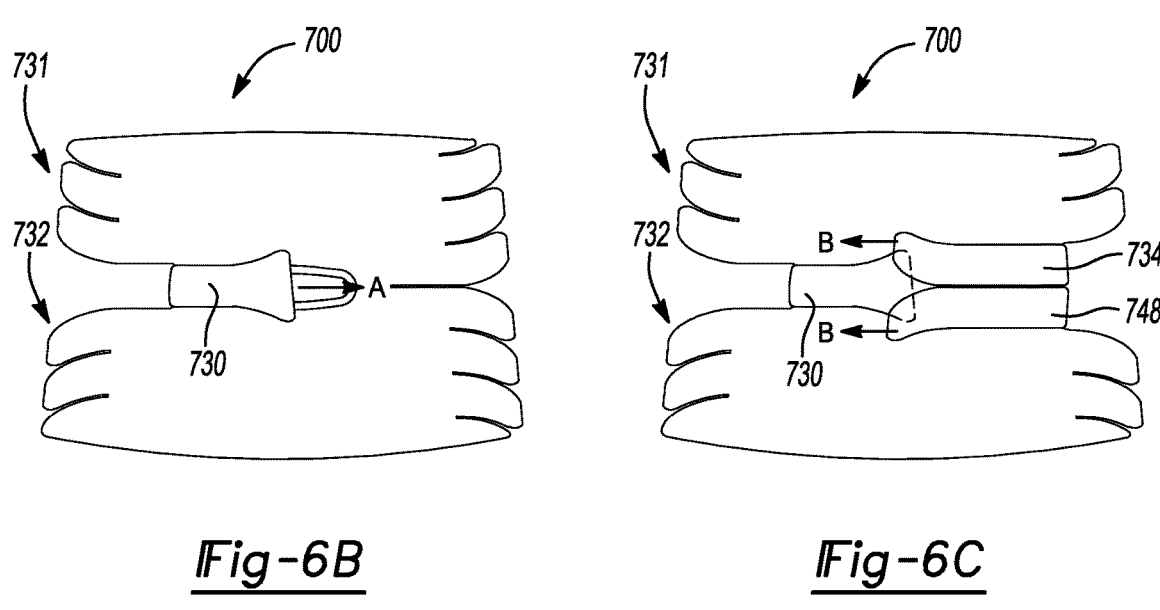
_Fig-6B_                    _Fig-6C_

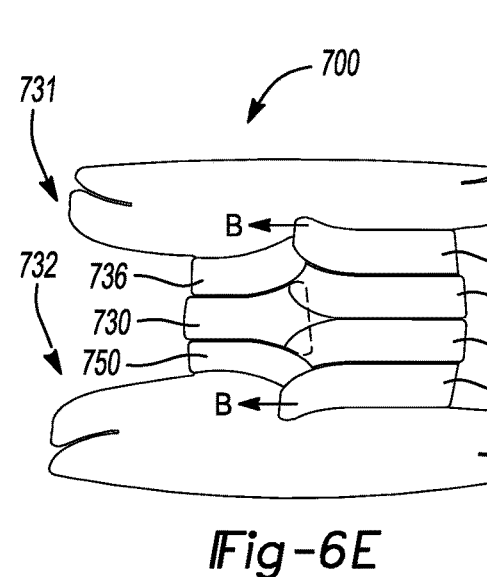
_Fig-6D_
_Fig-6E_
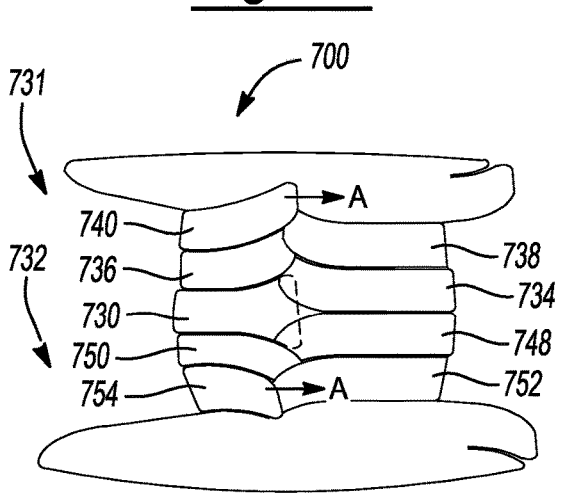
_Fig-6F_
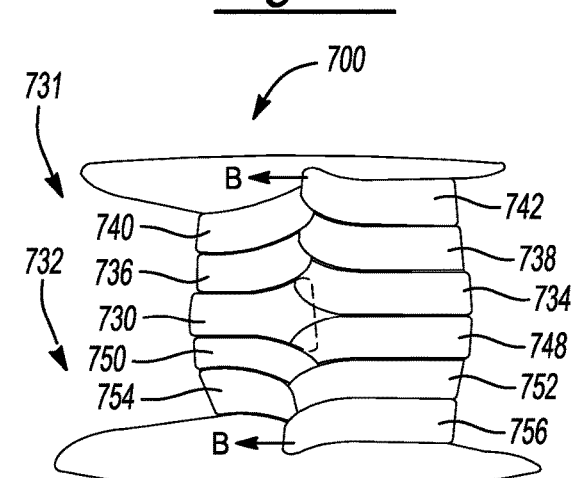
_Fig-6G_
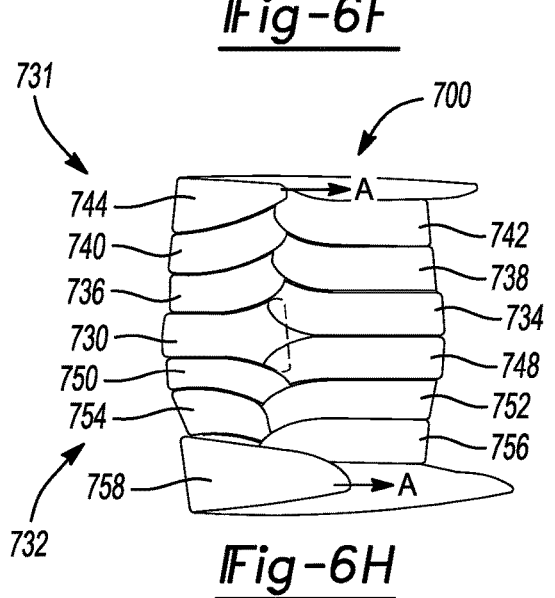
_Fig-6H_
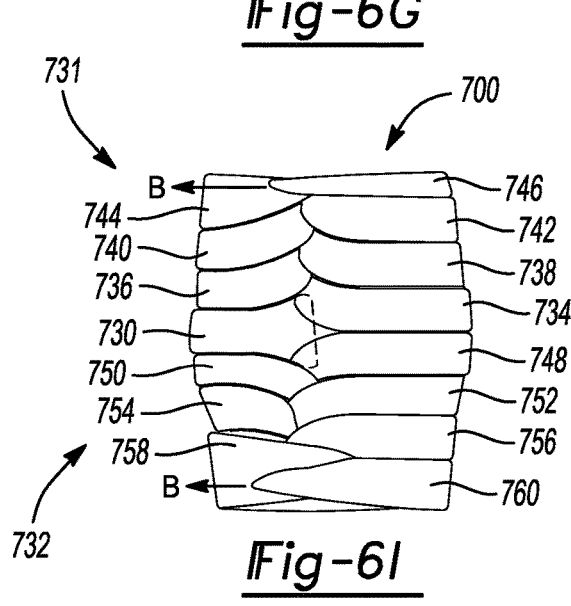
_Fig-6I_

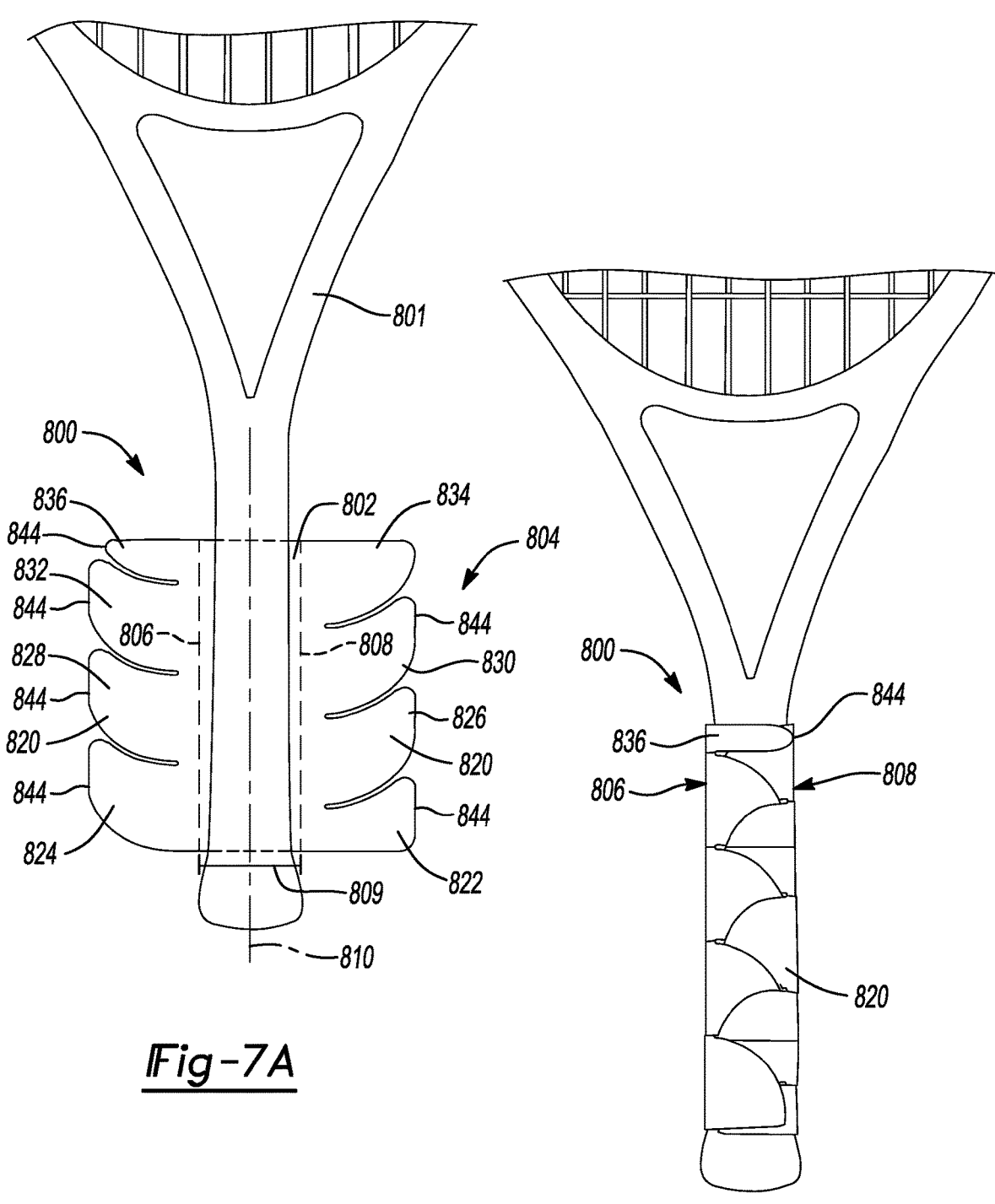
_Fig-7A_
_Fig-7B_

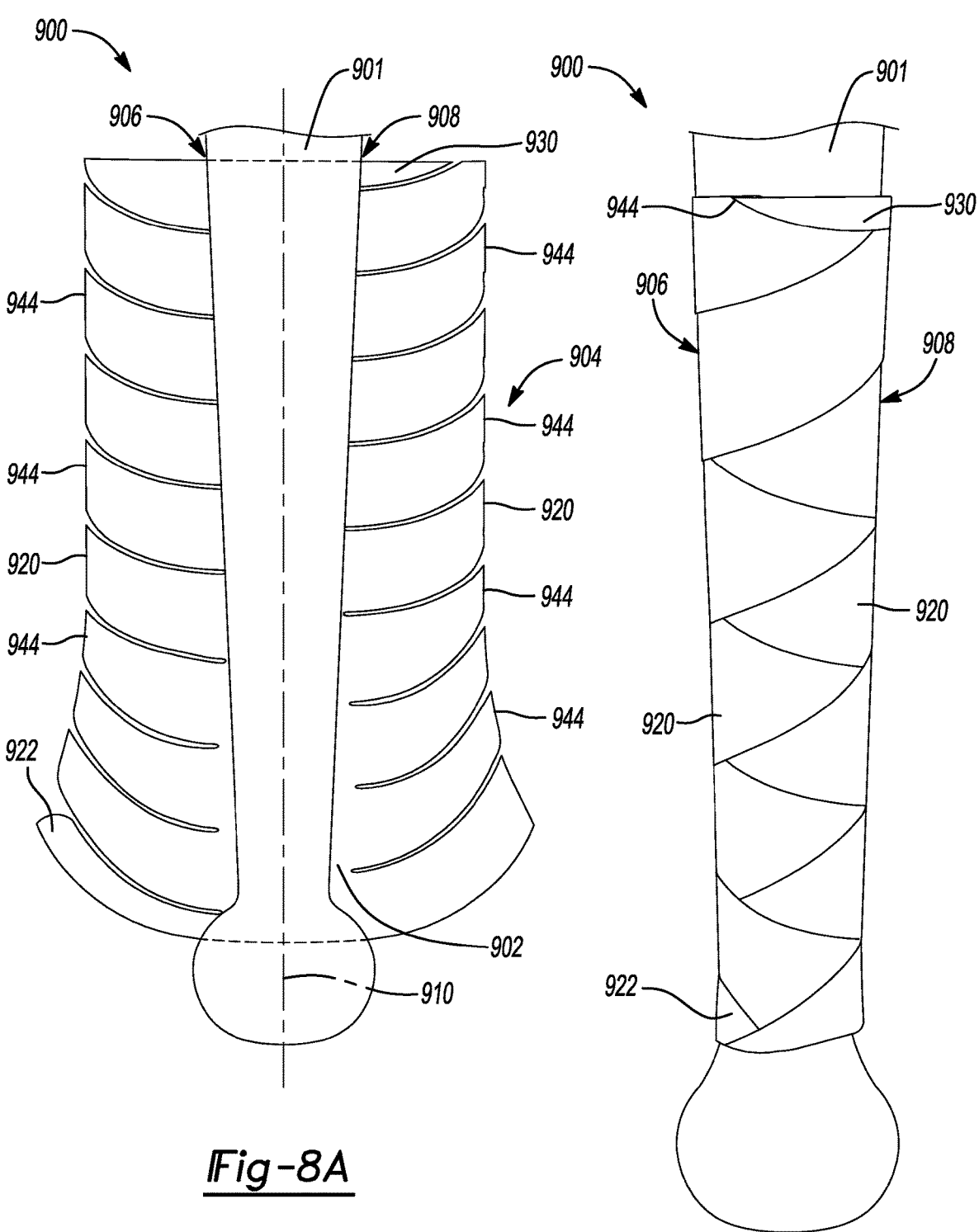
_Fig-8A_
_Fig-8B_

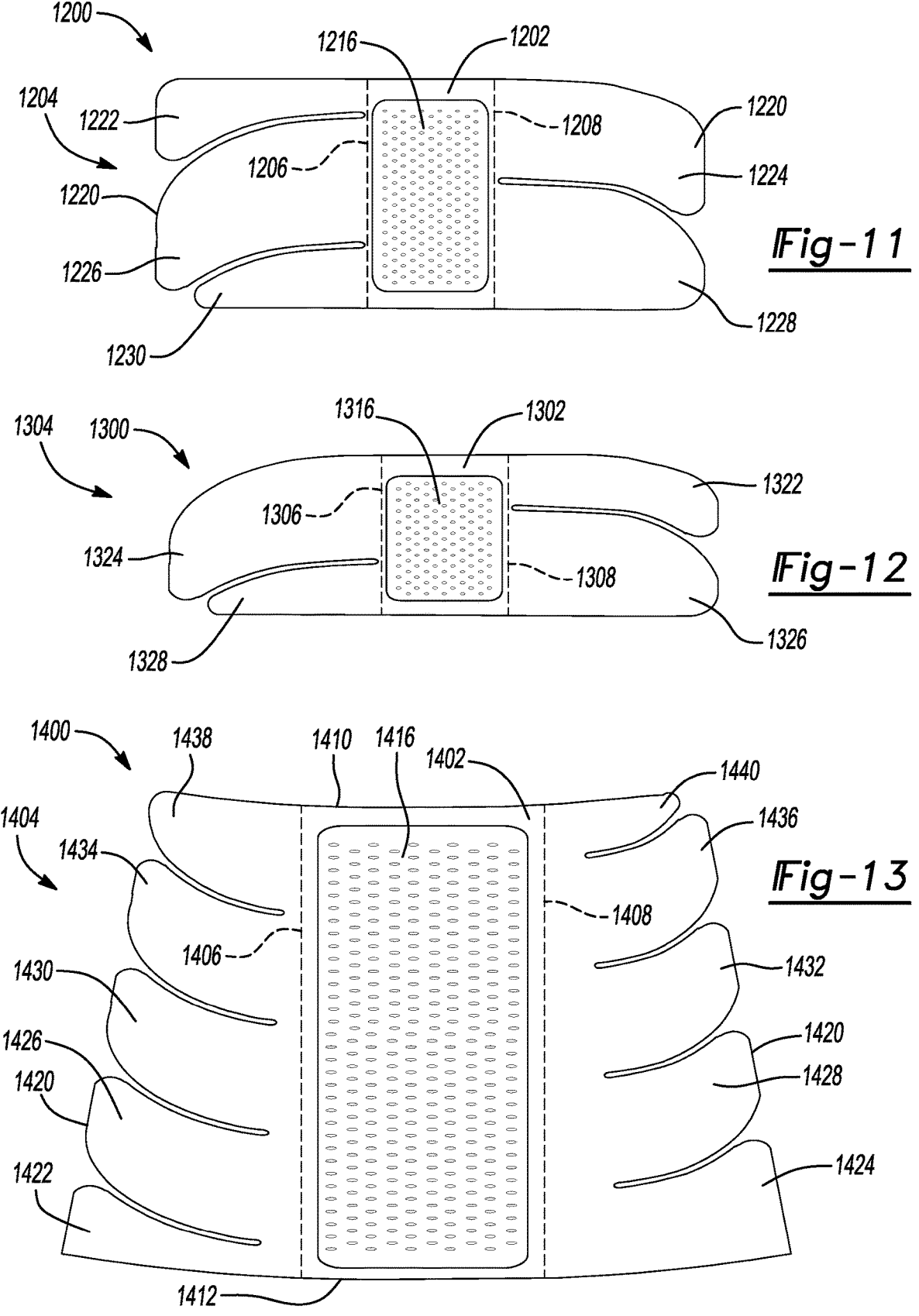
_Fig-11_
_Fig-12_
_Fig-13_

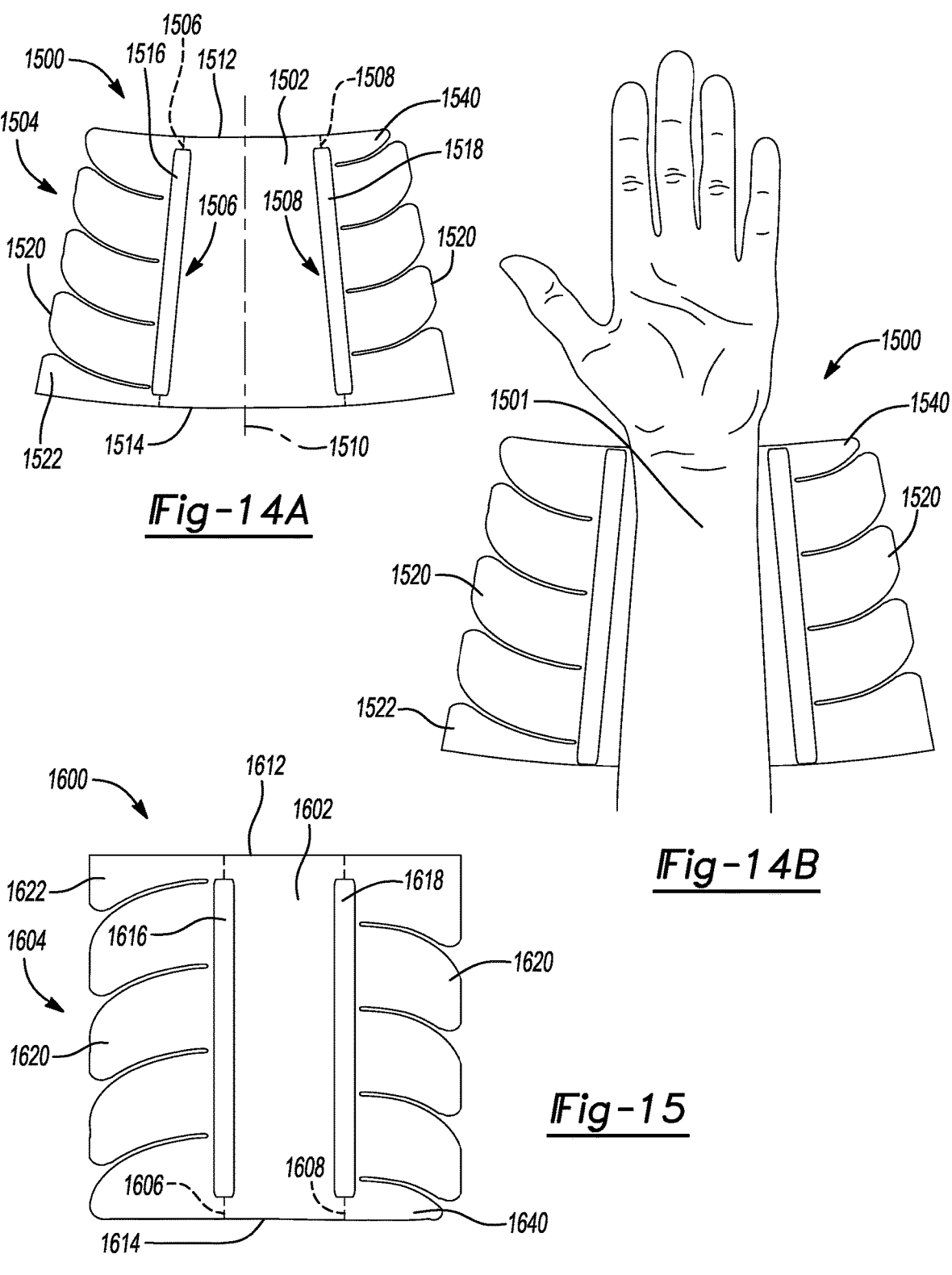
_Fig-14A_
_Fig-14B_
_Fig-15_

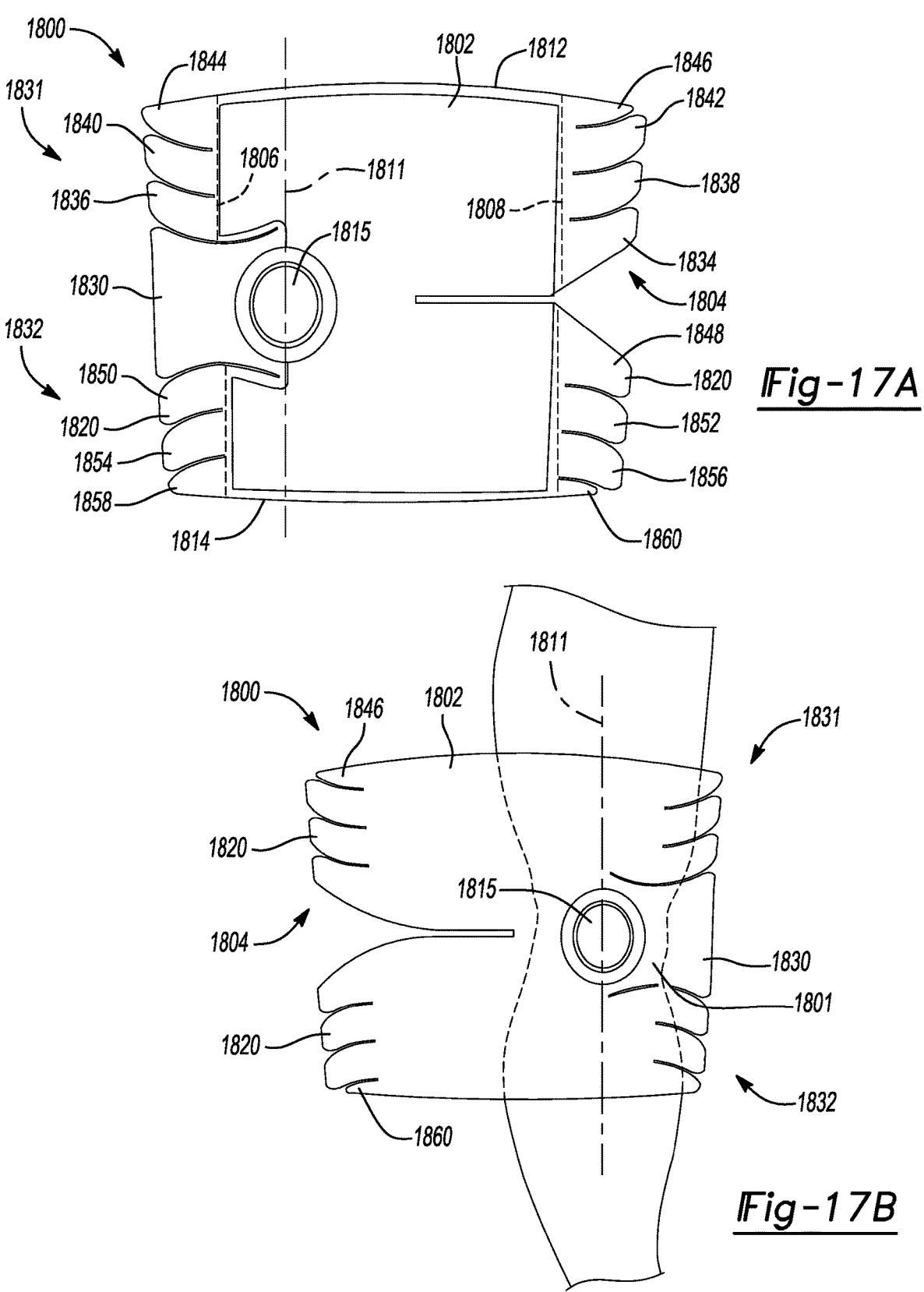
_Fig-17A_
_Fig-17B_

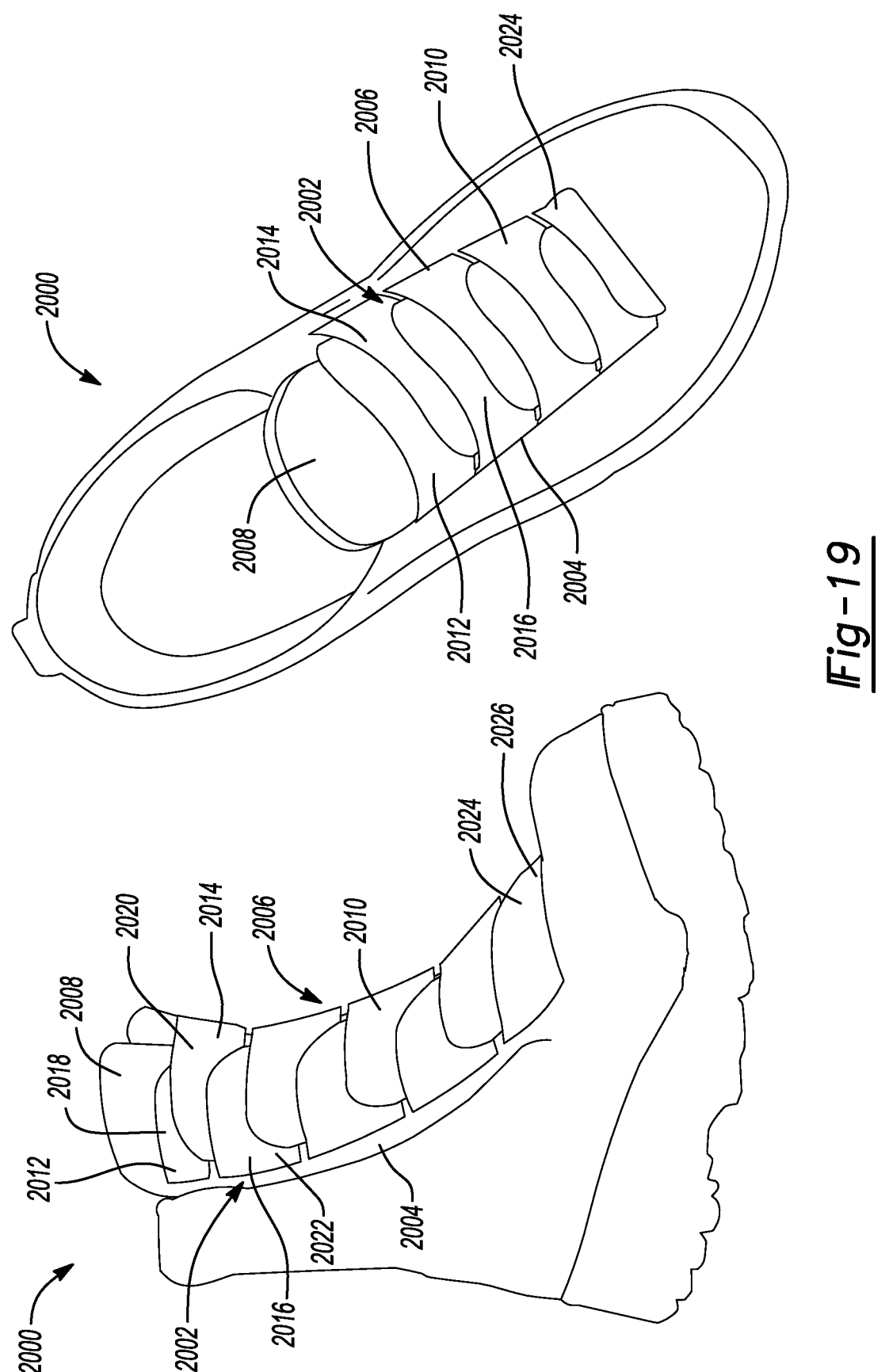
_Fig-19_

CLOSURE SYSTEM FOR COVERING A SURFACE OF AN OBJECT

CROSS-REFERENCE TO RELATED APPLICATIONS

This application is a continuation-in-part of U.S. patent application Ser. No. 18/315,170 filed on May 10, 2023, which is a continuation of U.S. patent application Ser. No. 17/020,623 filed on Sep. 2, 2020 (now U.S. Pat. No. 11,718,459 B1) which claims the benefit U.S. Provisional Application No. 62/922,856, filed on Sep. 3, 2019. The entire disclosure of the applications referenced above are incorporated herein by reference.

FIELD OF THE INVENTION

The present disclosure relates to a closure system for enclosing an outer surface of an object and methods of enclosing thereof. More particularly, the present disclosure describes a closure system including a plurality of tabs movable between a first position and a second position, the closure system being adapted to at least partially cover an object in the second position.

DESCRIPTION OF THE RELATED ART

The statements in this section merely provide background information related to the present disclosure and may not constitute prior art.

It has long been common to enclose objects (e.g., handles, tubes, or grip surfaces of sporting equipment, weapons, steering wheels, etc.) with a long piece of tape, overlapping previously applied portions of the tape round and round as the surface is covered. The user must wrap very carefully, making sure the overlap is consistent. User error makes it impossible to obtain a perfect result. In some cases, the long length required to cover a given space is unwieldy to control in tight spaces where the entire length must be wrapped around, until exhausted. Additionally, manufacturing the long lengths of tape required to wrap a given surface restricts the type of material that can be used.

Another method of enclosing rods, handles or tubes, has been to wrap a flexible material around and lace it on, making holes all down the edges of the material and using needle and thread. This solves the problems with tape but the lacing process is very time consuming and is difficult for users with low dexterity or lack of tools.

Another method of enclosing complex cylinders or shapes has been to dip them in a rubberized liquid. This works for items that are small and portable, but it does not work for items that are large or attached to larger items, such as a handrail. Some items are sensitive to liquid like a leather steering wheel. Also, the rubberized dip is not easily removable. Often, it must be cut away for removal, which would damage some objects.

Another method of enclosing complex cylinders or shapes has been to mold a specific shaped part out of one piece of material (e.g., a plastic, rubber or similar). Then the grip has to be fastened into place with adhesive or stretched into place using the material friction to affix. These can be difficult to install and they can only be installed on a rod or tool which has a free end not covered with a knob or attached to a larger part. This method is also restrictive, as it requires a part be made for each application. This method is also restricted to the use of base materials which can be melted and processed through the injection molding process.

Another method of enclosing complex objects (e.g., assorted items that need to be contained in a bag, or body parts such as fingers, hands, arms, feet, legs, etc., that need to be contained, supported and/or protected), has been to wrap a cord of string (e.g., a lace or shoelace) or a strap connector. The cord or strap methods are adjustable while securely enclosing the desired objects, however, the cords or strap connectors have multiple failure points. Every portion of the cord or strap is vulnerable to failure. As such, if any single portion of the cord or strap fails, then the entire enclosure fails.

Another method of enclosing complex objects (e.g., assorted items that need to be contained in a bag, or body parts such as fingers, hands, arms, feet, legs, etc., that need to be contained, supported and/or protected), has been to employ a zipper to secure them. Zippers are not desirable fasteners when subject to pressure. If one of the many teeth fails in the assembly, then the entire enclosure fails. Another disadvantage lies in the operation of the zipper itself. If any of the surrounding enclosure interrupts the delicate interlocking of the teeth, the zipper will lock, rendering it useless. Another disadvantage is that replacement of a damaged zipper assembly is more costly than the value of the enclosure.

SUMMARY

This section provides a general summary of the disclosure, and is not a comprehensive disclosure of its full scope or all of its features.

The present disclosure relates to a closure system for covering an outer surface of an object. The closure system may cover an object having a complex shapes such as, tubes (square, hexagonal, multi-planar), handles, rods, hoops, shoes, sporting equipment (e.g., rackets, bats), clothing, luggage, body appendages (e.g., knees, wrists, ankles, and/or fingers) with flat, flexible, material, which is easy to install, requiring no special skills or tools, eliminating undesirable loose ends at its' meeting point.

It is desired to have a closure system that easily and securely encloses an outer surface of an object (e.g., an object having a complex shape such as handles, rods, tubes, hoops, shoes, sporting equipment (e.g., rackets, bats, handlebars), clothing, luggage, body appendages (e.g., knees, wrists, ankles, and/or fingers)).

It is further desired that in a closed position, the closure system leaves no undesirable gaps or material overlaps at its meeting points.

It is further desired that the closure system be easy to install and/or use, requiring no special skills or tools.

It is further desired to have the closure system braid together at its meeting points, eliminating loose ends that could peel away due to frictional use. More specifically, that the closure system does not rely only on adhesive to stay affixed, but that the overlapping design of the tabs at the meeting point provide an additional layer of mechanical advantage to the wrap.

It is further desired that the closure system is capable of wrapping not just a straight rod or tube, but can enclose a surface of a hoop, body appendage, bulky objects, or similar objects containing compound curves and complex shapes.

It is further desired to manufacture the closure system with a flat piece of flexible material not much larger than the object it is covering.

It is further desired that the closure system could wrap the object in a repeating pattern exhibiting skill, that is consistent, and pleasing to the eye, without requiring tedious attention, or specific skills to the art of wrapping or braiding.

It is further desirable that the closure system is easy to remove without damaging the object to which it is attached.

It is further desired to use the technology to have many flexible material options, providing the unique benefits of each. For example, rubber adds additional grip for secure handling in low friction situations. Leather adds a pleasing sense of touch. Vinyl adds protection from elements.

It is further desired to enclose complex objects by a panel and a closure system of adjustable, interlocking tabs that share and/or distributes the enclosure load across the entire assembly. In other words, it is desired to have an enclosure having only one release point among multiple support points. If one support point fails, other support points in the enclosure are not affected.

It is further desired that the individual tabs of the closure system are folded by hand (i.e., the tabs are not snapped into place by exerting a large force). Moreover, it is desired that the enclosure does not include foreign objects, such as a zipper, to interfere with operation. It is also desired that the enclosure is not prone to costly repairs.

In the following description, numerous specific details and options of the present disclosure are set forth in order to provide a more thorough understanding of the present disclosure. It will be appreciated, however, by one skilled in the art, that the present disclosure may be practiced without such specific details or optional components, and that such descriptions are merely for convenience, and as such solely selected for the purpose of illustrating the disclosure. Reference to the drawings showing embodiments of the present disclosure are made to describe the disclosure and do not limit the scope of the disclosure herein.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIGS. 1A-1G show exemplary closure systems in accordance with the present disclosure;

FIGS. 2A-2F show an enclosure movable between a first position (FIG. 2A) and a second position (FIGS. 2C and 2D) including a closure system in accordance with the present disclosure;

FIGS. 3A-3I show an enclosure including a closure system and a first method of covering an object in accordance with the present disclosure;

FIGS. 4A-4F show an enclosure including a closure system and a second method of covering an object in accordance with the present disclosure;

FIGS. 6A-6H show an enclosure including a closure system and a fourth method of covering an object in accordance with the present disclosure;

FIGS. 7A-7B show an enclosure including a closure system movable between a first position (FIG. 7A) and a second position (FIG. 7B);

FIGS. 8A-8B show an enclosure including a closure system movable between a first position (FIG. 8A) and a second position (FIG. 8B);

FIG. 11 shows another enclosure including a closure system;

FIG. 12 shows another enclosure including a closure system;

FIG. 13 shows another enclosure including a closure system;

FIGS. 14A-14B show another enclosure including a closure system;

FIG. 15 shows another enclosure including a closure system;

FIGS. 17A-17B show another enclosure including a closure system;

FIG. 19 shows a shoe including a closure system in accordance with the present disclosure;

Corresponding reference numerals indicate corresponding parts throughout the several views of the drawings.

DETAILED DESCRIPTION

Figures 2A, 2B, 2C, 2D:
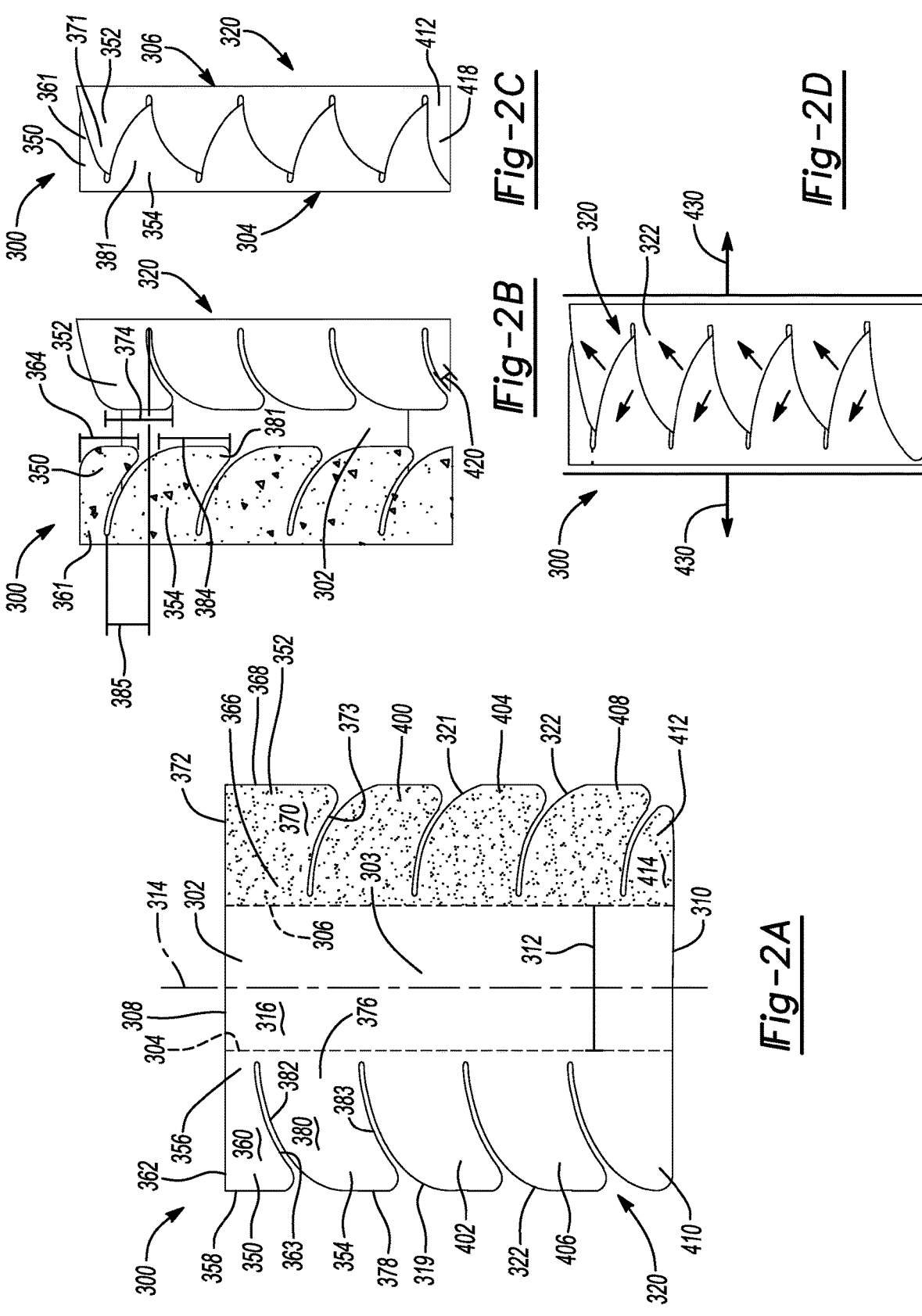

Example embodiments will now be described more fully with reference to the accompanying drawings.

According to one embodiment of the present disclosure, a flat, flexible material can be cut using one or more of the proposed designs, to transfer the desirable qualities of the given material to the object onto which it is applied. In particular, the disclosure allows the user to apply the desirable material qualities to the outside of objects having complex shapes using a simple flat piece of material. Specifically, this applies to wrapping handles, rods, tubes, hoops, shoes, sporting equipment (e.g., rackets, bats, etc.), luggage (e.g., backpacks, duffle bags, purses, etc.), apparel, body appendages (e.g., knees, wrists, ankles, and/or fingers), in their many examples. The goal is to at least partially cover or wrap an outer surface of these objects, applying the desired flexible material, without leaving loose ends to peel away.

According to another advantage of the present disclosure, the closure system is durable in response to friction use. The closure system combines existing adhesive technologies common to those familiar with the art of adhesives, with the formation of the material into a series of offset tabs that interlock when folded in the prescribed, alternating order at their meeting points. The closure system shape, dimension, and configuration may vary depending upon the shape of the object to be wrapped. However, the relation of the tabs to each other remains consistent so that they overlap without leaving any loose ends that may be peeled away with use. The disclosure allows the user to fold the tabs in similar fashion to a zipper only leaving the bottom tab exposed to use. However, unlike a zipper, the wrapping of the closure system from a first or open state to a second or closed state withstands desired pulling forces (e.g., forces that may unravel a braid or zipper) without requiring external hardware.

The shape and dimension (e.g., length, width, and/or thickness) of the tabs can be infinite in variation. As will be described in greater detail below, the closure system's design employs arrangement of the tabs in a specific offset and length to each other, prescribed by the shape and size of the object for which the wrap was created. This allows the tabs to be joined or braided together around the object with the aforementioned advantages.

With reference to FIGS. 1A-1G, exemplary closure systems are shown. In one example, as shown in FIG. 1G, closure system 100 includes a first tab 104, a second tab 108, a third tab 112, and a fourth tab 116. First tab 104 and third tab 112 extend laterally outwardly from a flexible panel 120 (the flexible panel could be considered a spine with tabs extending laterally outward therefrom) having a width 124. Flexible panel 120 has a longitudinally extending linear central axis 128. First tab 104 and third tab 112 extend from flexible panel 120 in a first laterally outward direction. First tab 104 includes a first edge 132 extending at an angle (e.g., a non-right angle) relative to central axis 128. First edge 132 includes a first end 136 intersecting flexible panel 120 and an opposite second end 140 positioned at a distal end 144 of first tab 104.

Third tab 112 includes a first edge 148 having a first end 152 intersecting flexible panel 120 and an opposite second end 156 positioned at a distal end 160 of third tab 112. At least a portion of first edge 148 of third tab 112 extends at a non-right angle relative to central axis 128.

Second tab 108 and fourth tab 116 extend from flexible panel 120 in a second laterally outward direction relative to central axis 128. Second tab 108 and fourth tab 116 are longitudinally spaced apart from one another having a gap 166 therebetween. Distal end 144 of first tab 104 is longitudinally offset (i.e., axially offset) from the second and fourth tabs 108, 116 such that distal end 144 of first tab 104 is transversally aligned with gap 166.

With reference to FIG. 2A-2D, an enclosure 300 includes a flexible panel 302. Flexible panel 302 is movable between a first or open position (FIG. 2A) and a second or closed position (FIGS. 2C and 2D) (and through an optional intermediate position (FIG. 2B)). In the first position, flexible panel 302 is relatively flat. In the second position, flexible panel 302 is adapted to cover a portion of an object. For example, in the second position, flexible panel 302 may cover all or a part of a surface of the object.

Flexible panel 302 includes a body 303 extending between a first panel edge 304 and an opposite second panel edge 306 and extending between a third panel edge 308 and an opposite fourth panel edge 310. First panel edge 304 is spaced apart from second panel edge 306. Body 304 may have a first dimension or width 312 between first panel edge 304 and second panel edge 306. Width 312 of body 303 may be tailored to a shape, dimension, or configuration of the object (e.g., a diameter of the object enclosed). A central axis 314 may extend in a first or longitudinal direction between third panel edge 308 and fourth panel edge 310. Body 303 includes a first or interior surface 316 and an opposite second or exterior surface (not shown).

Flexible panel 302 further includes a closure system 320. Closure system 320 includes a plurality of tabs 322 extending from each of the first panel edge 304 and the second panel edge 306 in a second or lateral direction. Plurality of tabs 322 may include a first set of tabs 319 extending from first panel edge 304 and a second set of tabs 321 extending from second panel edge 308.

The plurality of tabs 322 includes a first tab 350 (e.g., a first starting tab), a second tab 352, and a third tab 354. First tab 350 includes a first end 356 positioned adjacent to first panel edge 304 and extending outwardly from first panel edge 304 to a first distal end 358. First tab 350 includes a first surface 360 (FIG. 2A) and a second surface 361 (FIG. 2C) opposite first surface 360. First tab 350 also includes a first edge 362 and a second edge 363. Second edge 363 may extend at a first angle (e.g., a non-right angle) relative to central axis 314. Second edge 363 may be sloped downward relative to first edge 362. A first width 364 (FIG. 2B) of first tab 350 is defined at first distal end 358 between first edge 362 and second edge 363.

Second tab 352 includes a second end 366 positioned adjacent to second panel edge 306 and extending outwardly from second panel edge 306 to a second distal end 368. Second tab 352 includes a third surface 370 (FIG. 2A) and a fourth surface 371 (FIG. 2C) opposite third surface 370. Second tab 352 also includes a third edge 372 and a fourth edge 373. Fourth edge 373 may extend at a second angle (e.g., a non-right angle) relative to central axis 314. Fourth edge 373 be sloped downward relative to third edge 372. A second width 374 (FIG. 2B) of second tab 352 is defined at second distal end 368 between third edge 372 and fourth edge 373. As shown in the configuration of FIGS. 2A-2D, second width 374 is greater than first width 364.

Third tab 354 includes a third end 376 positioned adjacent to first panel edge 304 and extending outwardly from first panel edge 304 to a third distal end 378. Third tab 354 includes a fifth surface 380 (FIG. 2A) and a sixth surface 381 (FIG. 2C) opposite fifth surface 380. Third tab 354 also includes a fifth edge 382 and a sixth edge 383. Fifth edge 382 may extend at a third angle (e.g., a non-right angle) relative to central axis 314. Fifth edge 382 may be sloped downward relative to first edge 362 of first tab 350. Fifth edge 382 is spaced apart from second edge 363 of first tab 350. Sixth edge 383 may extend at a fourth angle (e.g., a non-right angle) relative to central axis 314. Sixth edge 383 be sloped downward relative to first edge 362 of first tab 350. Slopes of fifth edge 382 and sixth edge 383 may be complimentary (i.e., the curves of fifth edge 382 and sixth edge 383 may be substantially parallel). A third width 384 of third tab 354 is defined at third distal end 378 between fifth edge 382 and sixth edge 383.

First set of tabs 319 extending from first panel edge 304 may be axially offset from second set of tabs 321 extending from second panel edge 308 (e.g., offset in a longitudinal direction along central axis 314). A dimension 385 of the axial offset may correspond to a distance between fifth edge 382 of third tab 354 and fourth edge 373 of second tab 352. In this way, when enclosure 300 is in the second position (FIGS. 2C-2D), at least one of the plurality of tabs 320 is adapted to simultaneously engage with two other adjacent tabs.

In the second position (FIGS. 2C and 2D), first surface 360 of first tab 350 is removably attached to (e.g., contacts) a portion of an outer surface of object. Third surface 370 of second tab 352 is removably attached to second surface 361 of first tab 350. Fifth surface 380 of third tab 354 is removably attached to fourth surface 371 of second tab 352. In the configuration of FIGS. 2C-2D, the first distal end 358 is completely covered by second distal end 368 and second distal end 368 is completely covered by third distal end 378. However, in alternate arrangements, it is contemplated that second tab 352 only covers a portion of first distal end 358 of first tab 350 and third tab 354 only covers a portion of second distal end 368 of second tab 352 (see, e.g., closure system 2520 of FIGS. 24A-24B and closure system 2670 of FIGS. 25A-25B).

In the configuration of FIGS. 2A-2D, plurality of tabs 322 further includes a fourth tab 400 positioned adjacent to second panel edge 306, a fifth tab 402 positioned adjacent to first panel edge 304, a sixth tab 404 positioned adjacent to second panel edge 306, a seventh tab 406 positioned adjacent to first panel edge 304, an eighth tab 408 positioned adjacent to second panel edge 306, a ninth tab 410 positioned adjacent to first panel edge 304, and a tenth tab or locking tab 412 (hereafter "locking tab 412") positioned adjacent to second panel edge 306. The fourth tab 400, fifth tab 402, sixth tab 404, seventh tab 406, eighth tab 408, and ninth tab 410 may be the same as or similar to first tab 350, second tab 352, and/or third tab 354 except as described below. It should be appreciated, however, that this configuration is merely exemplary. It is contemplated that, in an alternate arrangement, plurality of tabs 322 includes more than 10 tabs, such as greater than or equal to 12 tabs, greater than or equal to 14 tabs, or greater than or equal to 20 tabs. Alternately, plurality of tabs 322 may include less than 10 tabs, such as less than or equal to 8 tabs, less than or equal to 6 tabs, or less than or equal to 4 tabs.

Tenth tab 412, may be the last tab to removably cover object. A seventh surface 414 (FIG. 2A) of locking tab 412 may cover a portion of a surface of the preceding tab. An eighth surface 418 (FIG. 2C) of locking tab 412 is not covered by any additional tabs. Locking tab 412 may have a fourth width 420 that is less than first width 364 of first tab 350, second width 374 of second tab 352, and/or third width 384 of third tab 352. In other words, locking tab 412 has a distal end 422 that is more narrowly tapered as compared to the other of the plurality of tabs 322.

The size, shape, and orientation of the tabs may be tailored to enclose objects having various configurations and features. Further, the size, shape, and orientation of the tabs may be tailored to enable efficient closure of enclosure 300, for example to move enclosure 300 from the open position (FIG. 2A) to the closed position (FIGS. 2C-2D). As shown in FIGS. 2A-2D, the plurality of tabs 322 (e.g., second tab 352, third tab 354, fourth tab 400, fifth tab 402, sixth tab 404, seventh tab 406, eighth tab 408, ninth tab 410) may have edges (see, e.g., fourth edge 373 of second tab 352, fifth edge 382 and/or sixth edge 383 of third tab 354) having a generally curved shape. With renewed reference to FIG. 1, It can be appreciated that some tabs have two surfaces with a curved shape (FIG. 1F) It is contemplated that in alternate configurations, only one of the surfaces is curved while the other of the surfaces extends linearly straight from a first edge and/or second edge of a flexible panel (FIGS. 1B, 1C, 1E). Additionally or alternatively, one or both of the surfaces may slope linearly downward (FIG. 1A, 1D, 1G). It is also possible that all or a portion of tabs have one or more surfaces having an upward slope (e.g., a surface extending linearly upward or curving upwards) (FIG. 1F). Any combination of tabs with varied size, spacing, and orientation may be utilized in closure system 320.

In the closed position, central axis 314 of flexible panel 302 is aligned with a longitudinal axis of object. As best shown in FIG. 2D, in the closed position, plurality of tabs 322 of closure system 320 are at least partially overlapped (e.g., interlocked) to cover a portion of a surface of object. Pulling forces 430 (e.g., from an external frictional source) are evenly distributed across the plurality of tabs 322. In this way, closure system 320 reduces localized forces on any one of the tabs 322. In this way, each of the plurality of tabs 322 functions as a support point. If one of the plurality of tabs 322 fails, the other support points in the enclosure are not affected (i.e., the load remains distributed among the remaining tabs). When enclosure 300 is used to cover a portion of a body appendage (e.g., wrist, finger, knee, ankle, etc.), the distribution of pulling forces may be more comfortable than conventional systems.

Flexible panel 302 may be formed of any material suitable to move between the first, flat position and the second, closed position. For example, flexible panel 302 may be formed of a fabric or textile, a polymer, a leather, etc.

In some configurations, flexible panel 302 may further include an adhesive on first surface 316. Additionally or alternatively, all or a portion of plurality of tabs 322 may include an adhesive (e.g., first surface 360 of first tab 350, third surface 370 of second tab 352, and/or fifth surface 380 of third tab 354). Adhesive on flexible panel 302 and/or plurality of tabs 322 may improve engagement between enclosure 300 and object, or between adjacent interlocked tabs 322 covering object. Moreover, an enclosure including adhesive may be able to withstand higher pulling forces (e.g. pulling forces 430 of FIG. 2D) as compared to an enclosure system that is free of adhesive. Effective strengthening of enclosure 300 may be achieved by the combination of adhesive and the interlocking design of closure system 320. A self-adhesive backing externally applied during assembly of enclosure 300 (e.g., to flexible panel 302 and/or plurality of tabs 322) before processing is most desirable. Conversely, flexible panel 302 may be formed of a material having self-adhesive properties (e.g., uncured rubber). Alternately, adhesive may be applied secondarily by a user. Adhesives include but are not exclusive to; gum rubber, acrylic adhesives, water-based adhesives, and combinations thereof. If no external adhesive is employed, or for additional strength, the disclosure can be affixed with a self-adhesive tape band around locking tab 412.

In some configurations, enclosure 300 may further include one or more fasteners, such as one or more of a plurality of hook and a plurality of loop fasteners. For example, as shown in FIGS. 2A and 2B, first set of tabs 319 may include one of a plurality of hooks and a plurality of loops (e.g., on second surface 361 of first tab 350 and/or fourth surface 381 of third tab 354) (FIG. 3B). Second set of tabs 321 may include the other of the plurality of hooks and the plurality of loops (e.g., on third surface 370 of second tab 352) (FIG. 3A). Specifically, second surface 361 of first tab 350 may include one of a plurality of hooks and a plurality of loops and third surface 370 of second tab 352 may include the other of the plurality of hooks and the plurality of loops.

In an alternate configuration, as shown in FIGS. 2E and 2F, each of the first set of tabs 319a includes a first surface with one of a plurality of hooks and a plurality of loops.

(FIG. 2E) The other of the plurality of hooks and the plurality of loops is provided on an opposite second surface of the same tab 319a (FIG. 2F). Similarly, each of the second set of tabs 321a includes a first surface having one of a plurality of hooks and a plurality of loops and an opposite surface of the same tab having the other of the plurality of hooks and the plurality of loops. Both described arrangements provide adjacent surfaces of the alternate tabs that may be removably attached to one another.

As will be described in greater detail below in the discussion of the various embodiments, the size and shape of flexible panel 302 may vary based on the size and shape of the object enclosed. It is contemplated that, in alternate configurations, flexible panel 302 may further include one or more apertures (see, e.g., flexible panel 1702 of FIGS. 16A-16C, flexible panel 1802 of FIGS. 17A-17B, flexible panel 1912 of FIGS. 18A and 18C, flexible panel 1952 of FIG. 18B, flexible panel 1502 of FIGS. 24A-24B, and/or flexible panel 2652 of FIGS. 25A-25B). A portion of the object may be received in the one or more apertures. Flexible panel 302 may further include a pad (e.g., a sterile pad) (see, e.g., pad 1116 of FIG. 10A, pad 1216 of FIG. 11, pad 1316 of FIG. 12, and/or pad 1416 of FIG. 13). Flexible panel 302 may further include one or more structural supports, such as splints (see, e.g., flexible panel 1502 of FIGS. 14A-14B and flexible panel 1602 of FIG. 15).

Generally, enclosure 300 is easy to install (i.e., cover object), without special tools or skills. Installation is to be achieved by peeling an adhesive backer off the material, leaving the adhesive exposed. Next, flexible panel 302 is placed longitudinally against the object to be covered (i.e., central axis 314 is aligned with longitudinal axis of object). Then, as will be discussed in greater detail below in the discussion accompanying FIGS. 3A-3I, 4A-4F, 5A-5M, and 6A-6H, the user folds plurality of tabs 322 in a crisscross, alternating pattern until closure system 320 is completely interlocked (e.g., braided) into place. Each of the plurality of tabs 322 is locked in by at least one adjacent tab, leaving no loose ends to fail (e.g., pull apart or fray). The adhesive cooperates with plurality of tabs 322 to provide for a desirable enclosure 300, which is resistant to failure with frictional use. When a user wishes to uncover object, user may unlock or unbraid the plurality of tabs 322 (e.g., in a reverse order) to move enclosure 300 from the closed position (FIGS. 2C-2D) to the open position (FIG. 2A).

According to another advantage of the present disclosure, in the closed position (FIGS. 2C-2D), enclosure 300 leaves an orderly pattern which is pleasing to the eye showing skill, but not requiring it. The user braids or interlocks plurality of tabs 322 in place without thought to uniformity or consistency, because this is built into the disclosure design. Plurality of tabs 322 are designed to nest together in relation to each other by design rather than tedious attention to detail on the part of the user. In the past this type of cover is only achieved by great detail and skill applied to wrapping with a long strip. This disclosure infuses braiding technology into a simple, flat, compact sheet.

Figure 3F:
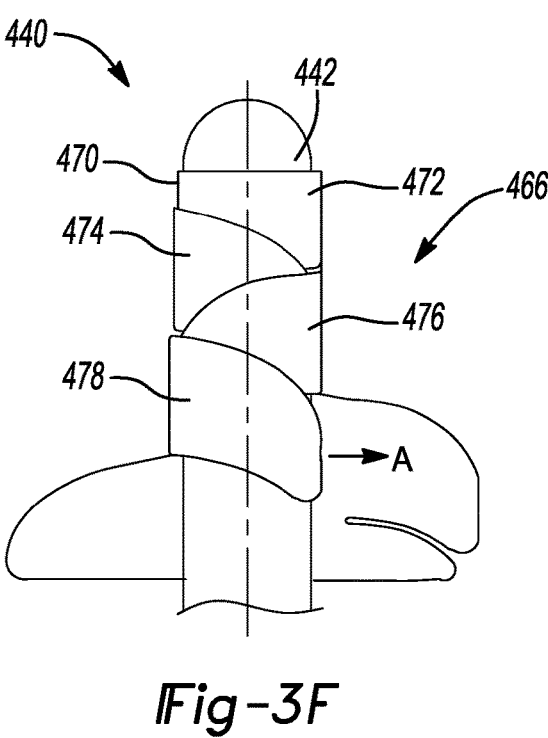

With reference to FIG. 3A-3I, a first method 440 of enclosing an object 442 is provided. First method 440 may enable an enclosure 450 to move from a first position to a second position to cover at least a portion of an outer surface 444 of object 442 (FIG. 3B). Enclosure 450 includes a flexible panel 452 and a closure system 454. Enclosure 450 may be the same as or similar to enclosure 300 of FIGS. 2A-2D except as otherwise described below. Flexible panel 452 includes a first panel edge 456 and an opposite second panel edge 458 spaced apart from first panel edge 456. A central axis 464 of flexible panel 450 extends in a first or longitudinal direction.

Closure system 454 includes a plurality of tabs 466 extending from each of first panel edge 456 and second panel edge 458 in a second or lateral direction. Plurality of tabs 466 includes a first or starting tab 470 positioned adjacent to first panel edge 456, a second tab 472 positioned adjacent to second panel edge 458, a third tab 474 positioned adjacent to first panel edge 456, a fourth tab 476 positioned adjacent to second panel edge 458, a fifth tab 478 positioned adjacent to first panel edge 456, a sixth tab 480 positioned adjacent to second panel edge 458, a seventh tab 482 positioned adjacent to first panel edge 456, and a locking tab 484 positioned adjacent to second panel edge 458. It is contemplated that a first portion of the plurality of tabs 466 may include one of a plurality of hooks and a plurality of loops on at least one surface and a second portion of the plurality of tabs 466 may include the other of the plurality of hooks and the plurality of loop on at least one surface.

In FIGS. 3A-3B, the first method 440 includes engaging the flexible panel 302 with outer surface of object 442. Central axis 464 of flexible panel 452 is aligned with a longitudinal axis of object 442. Next, starting tab 470 is wrapped in a first circumferential direction A around object 442.

Figure 3G:
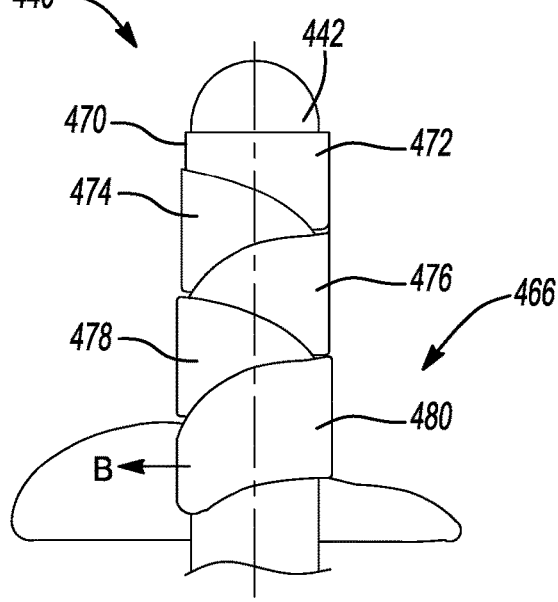
Figure 3H:
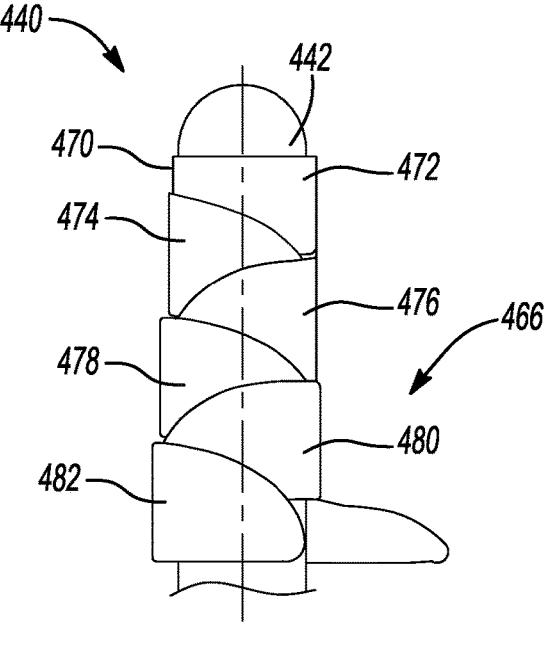
Figure 3I:
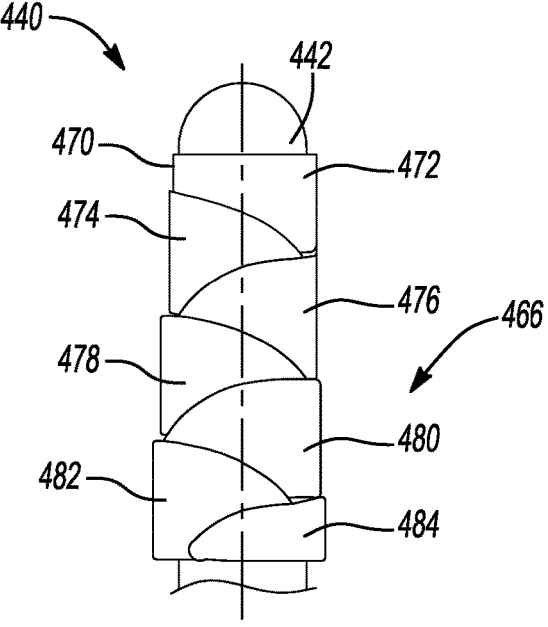

In FIG. 3C, second tab 472 is wrapped in a second circumferential direction B around object 442 to at least partially overlap first tab 470. Second circumferential direction B may be opposite first circumferential direction A. In FIG. 3D, third tab 474 is wrapped in first circumferential direction A around object 442 to at least partially overlap second tab 472. In FIG. 3E, fourth tab 476 is wrapped in second circumferential direction B around object 442 to at least partially overlap third tab 474. In FIG. 3F, fifth tab 478 is wrapped in first circumferential direction A around object 442 to at least partially overlap fourth tab 476. In FIG. 3G, sixth tab 480 is wrapped in second circumferential direction B around object 442 to at least partially overlap fifth tab 478. In FIG. 3H, seventh tab 482 is wrapped in first circumferential direction A to at least partially overlap sixth tab 480. In FIG. 3I, locking tab 484 is wrapped in second circumferential direction B around object 442 to at least partially overlap seventh tab 482.

While closure system 454 includes eight tabs in the configuration of FIGS. 3A-3I, it should be appreciated that first method 440 may be utilized on an enclosure with any number of tabs (e.g., a closure system including more than eight tabs, or alternately, less than eight tabs).

In certain configurations, a closure system may include a first closure system and a second closure system. The first closure system and second closure system may be independently wrapped around an object (i.e., moved from an open position to a closed position). The first closure system and the second closure system may be simultaneously or sequentially wrapped around the object.

With reference to FIGS. 4A-4F, a second method 500 of enclosing an object 502 (FIG. 4B) is provided. Second method 500 may enable an enclosure 510 (FIG. 4A) having a first closure system 504 and a second closure system 506 spaced apart from first closure system 504 to move from a first or open position to a second or closed position (FIG. 4F) to cover at least a portion of an outer surface of object 502.

Enclosure 510 includes a flexible panel 512, first closure system 504 and second closure system 506. Enclosure 510 may be the same as or similar to enclosure 300 of FIGS. 2A-2D or enclosure 450 of FIGS. 3A-3I, except as otherwise described below. Flexible panel 512 includes a first panel edge 516 and an opposite second panel edge 518 spaced apart from first panel edge 516. A central axis 520 of flexible panel 510 extends in a first or longitudinal direction.

First closure system 504 includes a first plurality of tabs 524. Second closure system 506 includes a second plurality of tabs 526. Second plurality of tabs 526 may be spaced apart from first plurality of tabs 524, such as to form a gap 525 around object 502 in the closed position (FIG. 4F). A gap between first plurality of tabs 524 and second plurality of tabs 526 may permit motion between first and second portions of an object along an axis 527 that may extend laterally relative to axis 520. The first and the second plurality of tabs 524, 526, extend from each of first panel edge 516 and second panel edge 518 in a second or lateral direction.

First plurality of tabs 524 includes a first starting tab 530 positioned adjacent to first panel edge 516, a second tab 532 positioned adjacent to second panel edge 518, a third tab 534 positioned adjacent to first panel edge 516, a fourth tab 536 positioned adjacent to second panel edge 518, and a first locking tab 538 positioned adjacent to first panel edge 516. Second plurality of tabs 526 includes a second starting tab 540 positioned adjacent to first panel edge 516, a fifth tab 544 positioned adjacent to second panel edge 518, a sixth tab 546 positioned adjacent to first panel edge 516, and a second locking tab 548 positioned adjacent to second panel edge 518. It is contemplated that a first portion of the first and/or second plurality of tabs 524,526 may include one of a plurality of hooks and a plurality of loops on at least one surface and a second portion of the first and/or second plurality of tabs 524,526 may include the other of the plurality of hooks and the plurality of loop on at least one surface.

The second method 500 includes engaging flexible panel 512 with outer surface of object 502. Central axis 514 of flexible panel 512 is aligned with a longitudinal axis of object 502.

In FIG. 4B, first starting tab 530 and second starting tab 540 are wrapped in a first circumferential direction A around object 502. In FIG. 4C, second tab 532 and fifth tab 544 are wrapped in a second circumferential direction B around object 502. In FIG. 4D, third tab 534 and sixth tab 546 are wrapped in first circumferential direction A around object 502. In FIG. 4E, fourth tab 536 and second locking tab 548 are wrapped in second circumferential direction B around object 502. In FIG. 4F, first locking tab 538 is wrapped in first circumferential direction A around object 502. In this way, second tab 532 at least partially overlaps first starting tab 530. Third tab 534 at least partially overlaps second tab 532. Fourth tab 536 at least partially overlaps third tab 534. First locking tab 538 at least partially overlaps fourth tab 536. Likewise, fifth tab 544 at least partially overlaps second starting tab 540. Sixth tab 546 at least partially overlaps fifth tab 544. Second locking tab 548 at least partially overlaps sixth tab 546.

While enclosure 510 includes two closure systems in the configuration of FIGS. 4A-4F, it should be appreciated that second method 500 may be utilized on an enclosure with any number of closure systems, tabs and/or portions of tabs to efficiently cover object 502 (e.g., to comfortably secure an object while permitting motion of the object about a joint).

With reference to FIGS. 5A-5M, a third method 600 of enclosing an object (not shown) is provided. Third method 600 may enable an enclosure 610 (FIG. 5A) to move from a first or open position to a second or closed position (FIG. 5M) to cover at least a portion of an outer surface of object.

Enclosure 610 may be the same as or similar to enclosure 300 of FIGS. 2A-2D, enclosure 450 of FIGS. 3A-3I, and/or enclosure 510 of FIGS. 4A-4F, except as otherwise described below.

Enclosure 610 includes a flexible panel 612 and a closure system 614. Flexible panel 612 includes a first panel edge 616 and an opposite second panel edge 618 spaced apart from first panel edge 616. A central axis 621 of flexible panel 612 extends in a first or longitudinal direction between a third panel edge 622 and a fourth panel edge 623.

Closure system 614 includes a first plurality of tabs 624, a second plurality of tabs 626, and a locking tab 628. Second plurality of tabs 626 may be spaced apart from first plurality of tabs 624. The first and the second plurality of tabs 624, 626, extend from each of first panel edge 614 and second panel edge 618 in a second or lateral direction.

First plurality of tabs 624 includes a first starting tab 630 positioned adjacent to first panel edge 616, a second tab 632 positioned adjacent to second panel edge 618, a third tab 634 positioned adjacent to first panel edge 616, a fourth tab 636 positioned adjacent to second panel edge 618, a fifth tab 638 positioned adjacent to first panel edge 616, and a sixth tab 640 positioned adjacent to second panel edge 618. Second plurality of tabs 626 includes a second starting tab 642 positioned adjacent to second panel edge 618, a seventh tab 644 positioned adjacent to first panel edge 616, an eighth tab 646 positioned adjacent to second panel edge 618, a ninth tab 648 positioned adjacent to first panel edge 616, and a tenth tab 650 positioned adjacent to second panel edge 618. Locking tab 628 is positioned adjacent to first panel edge 616 between first plurality of tabs 624 and second plurality of tabs 626. It is contemplated that a first portion of the first and/or second plurality of tabs 624,626 may include one of a plurality of hooks and a plurality of loops on at least one surface and a second portion of the first and/or second plurality of tabs 624,626 may include the other of the plurality of hooks and the plurality of loop on at least one surface.

The third method 600 includes engaging flexible panel 612 with outer surface of object. Central axis 614 of flexible panel 612 is aligned with a longitudinal axis of object.

Figures 5A, 5B, 5C:
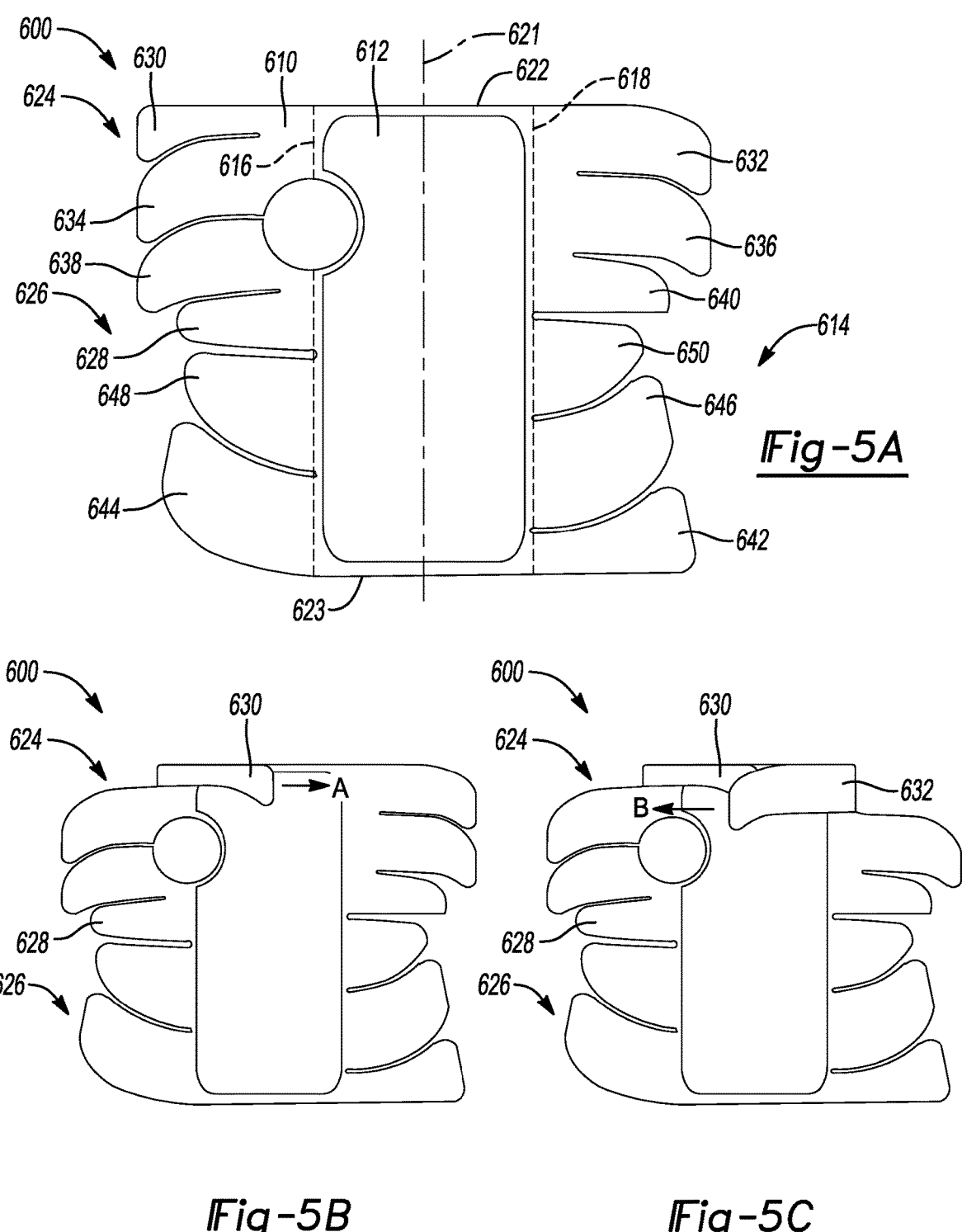
FIGS. 5A-5M show an enclosure including a closure system and a third method of covering an object in accordance with the present disclosure.
Figures 5D, 5E, 5F, 5G, 5H:
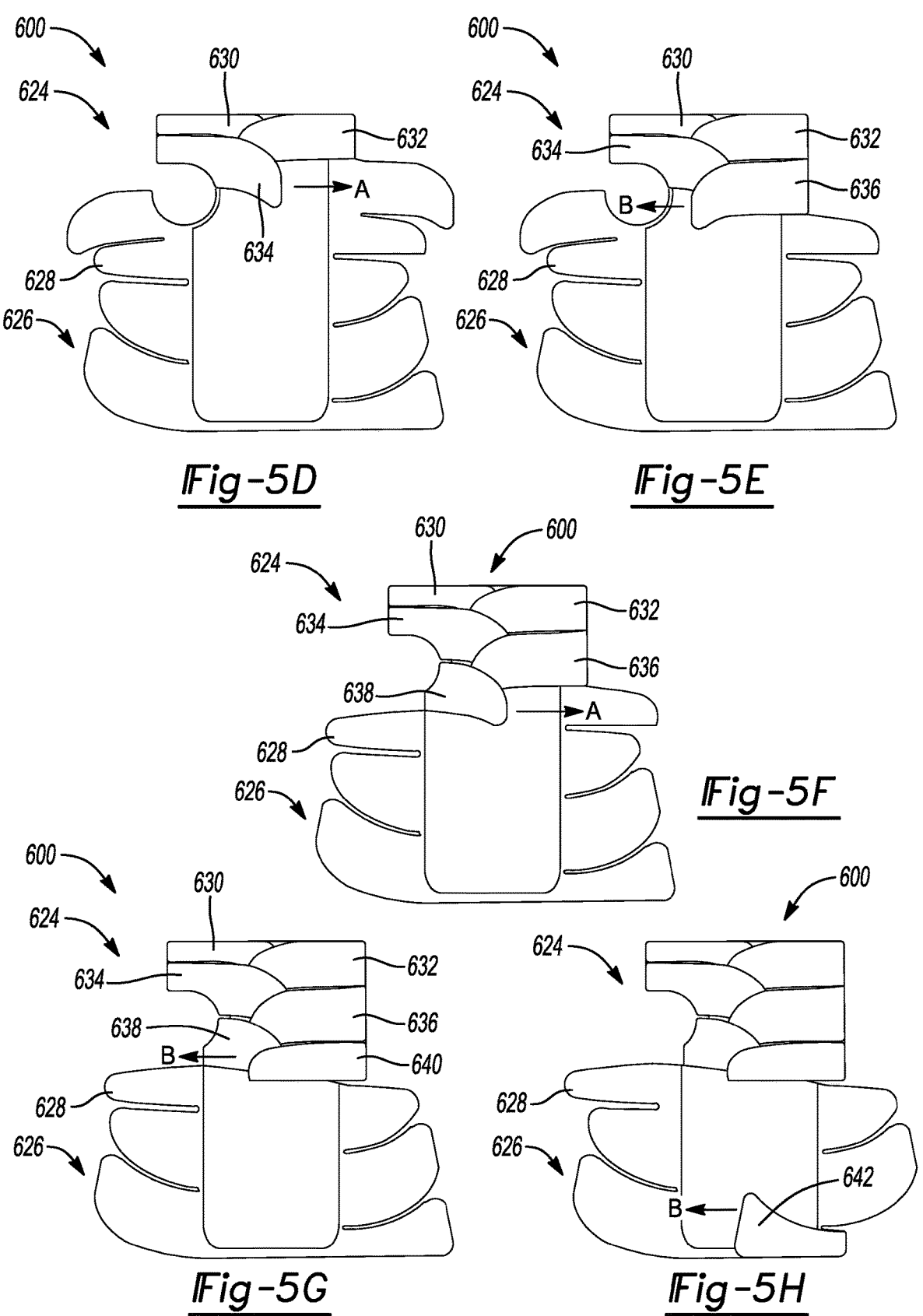
Figures 5I, 5J, 5K, 5L, 5M:
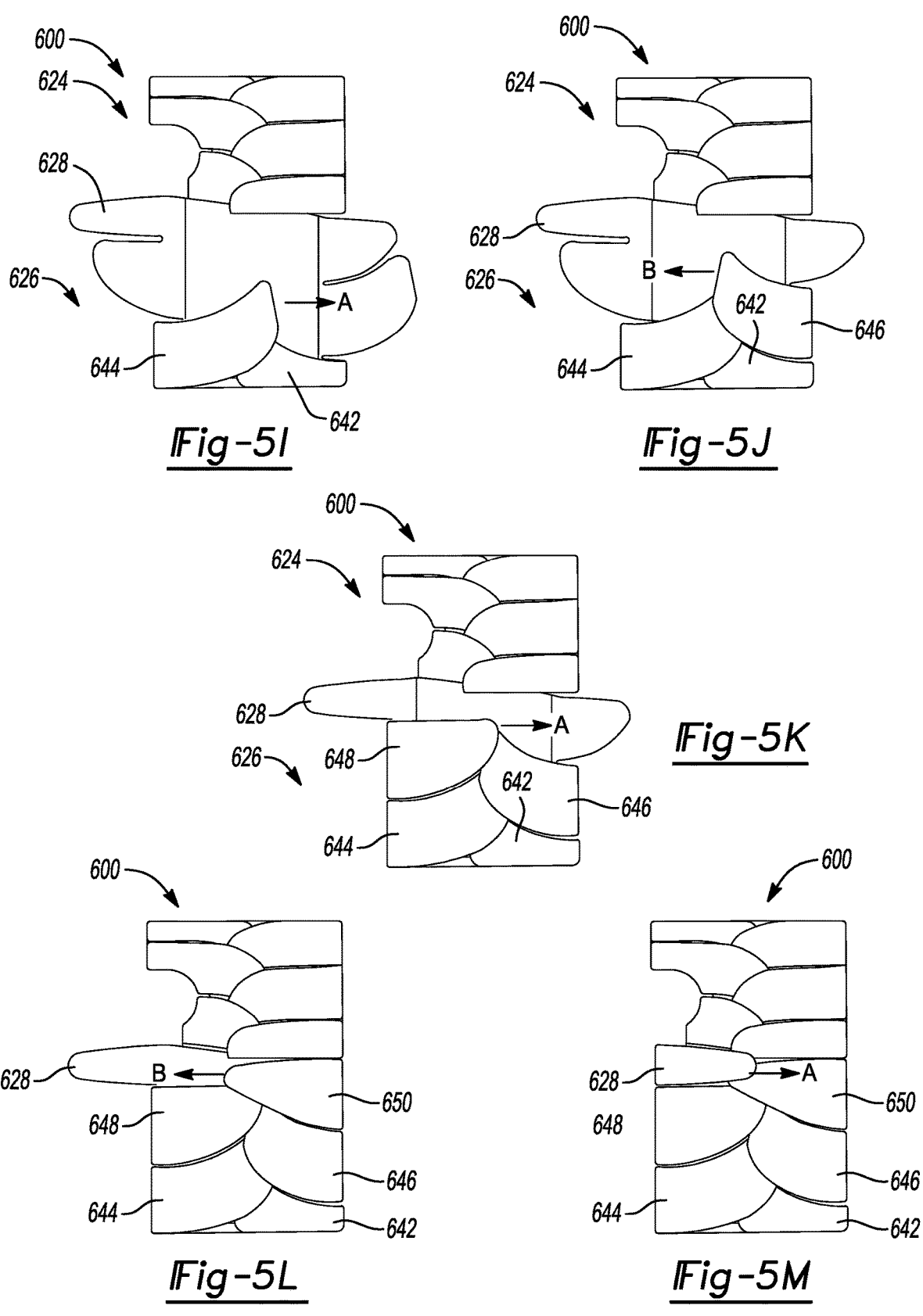

In FIG. 5B, first starting tab 630 is wrapped in a first circumferential direction A around object. In FIG. 5C, second tab 632 is wrapped in a second circumferential direction B around object. In FIG. 5D, third tab 634 is wrapped in first circumferential direction A around object. In FIG. 5E, fourth tab 636 is wrapped in second circumferential direction B around object. In FIG. 5F, fifth tab 638 is wrapped in first circumferential direction A around object. In FIG. 5G, sixth tab 640 is wrapped in second circumferential direction B around object. In FIG. 5H, second starting tab 642 is wrapped in second circumferential direction B around object. In FIG. 5I, seventh tab 644 is wrapped in first circumferential direction A around object. In FIG. 5J, eighth tab 646 is wrapped in second circumferential direction B around object. In FIG. 5K, ninth tab 648 is wrapped in first circumferential direction A around object. In FIG. 5L, tenth tab 650 is wrapped in second circumferential direction B around object. In FIG. 5M, locking tab 628 is wrapped in first circumferential direction A around object.

In this way, first starting tab 630 and second starting tab 642 contact object. Second tab 632 at least partially overlaps first starting tab 630. Third tab 634 at least partially overlaps second tab 632. Fourth tab 636 at least partially overlaps third tab 634. Fifth tab 638 at least partially overlaps fourth tab 636. Sixth tab 640 at least partially overlaps fifth tab 638. Seventh tab 644 at least partially overlaps second starting tab 642. Eighth tab 646 at least partially overlaps seventh tab 644. Ninth tab 648 at least partially overlaps eighth tab 646. Tenth tab 650 at least partially overlaps ninth tab 648. Locking tab 628 at least partially overlaps both sixth tab 640 and tenth tab 650.

With reference to FIGS. 6A-6H, a fourth method 700 of enclosing an object is provided. Fourth method 700 may enable an enclosure 710 to move from a first position to a second position to cover at least a position of an outer surface of object. Enclosure 710 may be the same as or similar to enclosure 300 of FIGS. 2A-2D, enclosure 450 of FIGS. 3A-3G, enclosure 510 of FIGS. 4A-4F, and/or enclosure 610 of FIGS. 5A-5M, except as otherwise described below.

Enclosure 710 includes a flexible panel 712 and a closure system 714. Flexible panel 712 includes a first panel edge 716 and an opposite second panel edge 718 spaced apart from first panel edge 716. A central axis 724 of flexible panel 712 extends in a first or longitudinal direction.

Closure system 714 includes a plurality of tabs 726 extending from each of the first panel edge 716 and second panel edge 718 in a second or lateral direction. Plurality of tabs 726 includes a first or starting tab 730, a first or upper portion of tabs 731 and a second or lower portion of tabs 732. Starting tab 730 is positioned adjacent to first panel edge 716. First portion of tabs 731 includes a second tab 734 positioned adjacent to second panel edge 718, a third tab 736 positioned adjacent to first panel edge 716, a fourth tab 738 positioned adjacent to second panel edge 718, a fifth tab 740 positioned adjacent to first panel edge 716, a sixth tab 742 positioned adjacent to second panel edge 718, a seventh tab 744 positioned adjacent to first panel edge 716, and a first locking tab 746 positioned adjacent to second panel edge 718. Second portion of tabs 732 includes an eighth tab 748 positioned adjacent to second panel edge 718, a ninth tab 750 positioned adjacent to first panel edge 716, a tenth tab 752 positioned adjacent to second panel edge 718, an eleventh tab 754 positioned adjacent to first panel edge 716, a twelfth tab 756 positioned adjacent to second panel edge 718, a thirteenth tab 758 positioned adjacent to first panel edge 716, and a second locking tab 760 positioned adjacent to second panel edge 718. It is contemplated that a first portion of the plurality of tabs 726 may include one of a plurality of hooks and a plurality of loops on at least one surface and a second portion of the plurality of tabs 726 may include the other of the plurality of hooks and the plurality of loop on at least one surface.

In FIGS. 6B-6H, fourth method 700 includes engaging flexible panel 712 with outer surface of object. Central axis 724 of flexible panel 712 is aligned with a longitudinal axis of object.

As shown in FIG. 6B, starting tab 730 is wrapped in a first circumferential direction A around object. In FIG. 6C, second tab 734 and eighth tab 748 are wrapped in a second circumferential direction B around object. In FIG. 6D, third tab 736 and ninth tab 750 are wrapped in first circumferential direction A around object. In FIG. 6E, fourth tab 738 and tenth tab 752 are wrapped in second circumferential direction B around object. In FIG. 6F, fifth tab 740 and eleventh tab 754 are wrapped in first circumferential direction A around object. In FIG. 6G, sixth tab 742 and twelfth tab 756 are wrapped in second circumferential direction B around object. In FIG. 6H, seventh tab 744 and thirteenth tab 758 are wrapped in first circumferential direction A around object. In FIG. 6I, first locking tab 746 and second locking tab 760 are wrapped in second circumferential direction B around object.

In this way, each of second tab 734 and eighth tab 748 at least partially overlap starting tab 730. Third tab 736 at least partially overlaps second tab 734. Fourth tab 738 at least partially overlaps third tab 736. Fifth tab 740 at least partially overlaps fourth tab 738. Sixth tab 742 at least partially overlaps fifth tab 740. Seventh tab 744 at least partially overlaps sixth tab 742. First locking tab 746 at least partially overlaps seventh tab 744. Ninth tab 750 at least partially overlaps eighth tab 748. Tenth tab 752 at least partially overlaps ninth tab 750. Eleventh tab 754 at least partially overlaps tenth tab 752. Twelfth tab 756 at least partially overlaps eleventh tab 754. Thirteenth tab 758 at least partially overlaps twelfth tab 756. Second locking tab 760 at least partially overlaps thirteenth tab 758.

While closure system 714 includes two portions of tabs in the configuration of FIGS. 6A-6H, it should be appreciated that fourth method 700 may be utilized on an enclosure with any number of tabs and/or portions of tabs to efficiently cover object (e.g., to comfortably secure an object while permitting motion of the object about a joint).

With reference to FIGS. 7A-7B, an enclosure 800 is adapted to move between a first or open position (FIG. 7A) to a second or closed position (FIG. 7B) to cover a piece of sporting equipment. Specifically, enclosure 800 is adapted to cover a portion of a racket handle 801. Enclosure 800 may be the same as or similar to enclosure 300 of FIGS. 2A-2D and enclosure 450 of FIGS. 3A-3I, except as otherwise described below.

Enclosure 800 includes a flexible panel 802 and a closure system 804. Flexible panel 802 includes a first panel edge 806 and an opposite second panel edge 808 spaced apart from first panel edge 806. A width 809 of flexible panel 802 between first panel edge 806 and second panel edge 808 may correspond to a width (not shown) of racket handle 801. Flexible panel 802 includes a central axis 810 extending longitudinally between a third panel edge 812 and a fourth panel edge 814. Central axis 810 of flexible panel 802 is aligned with a longitudinal axis of racket handle 801.

Closure system 804 includes a plurality of tabs 820 extending from each of first panel edge 806 and second panel edge 808. Plurality of tabs 820 are adapted to at least partially overlap in the closed position. Plurality of tabs 820 include a first or starting tab 822 positioned adjacent to second panel edge 808, a second tab 824 positioned adjacent to first panel edge 806, a third tab 826 positioned adjacent to second panel edge 808, a fourth tab 828 positioned adjacent to first panel edge 806, a fifth tab 830 positioned adjacent to second panel edge 808, a sixth tab 832 positioned adjacent to first panel edge 806, a seventh tab 834 positioned adjacent to second panel edge 808, and a locking tab 836 positioned adjacent to first panel edge 806.

As best shown in FIG. 7B, plurality of tabs 820 are at least partially overlapped such that a portion of distal ends 844 of each of the plurality of tabs 820 are covered by an adjacent tab. Starting tab 822 contacts a surface of racket handle 801. Second tab 824 contacts at least a portion of starting tab 822. Third tab 826 contacts at least a portion of second tab 824. Fourth tab 828 contacts at least a portion of third tab 826. Fifth tab 830 contacts at least a portion of fourth tab 828. Sixth tab 832 contacts at least a portion of fifth tab 830. Seventh tab 834 contacts at least a portion of sixth tab 832. Locking tab 836 contacts at least a portion of seventh tab 834. Distal end 844 of locking tab 836 is not covered by an adjacent tab.

Referring to FIGS. 8A-8B, an enclosure 900 is adapted to move between a first or open position (FIG. 8A) to a second or closed position (FIG. 8B) to cover a portion of a piece of sporting equipment. Specifically, enclosure 900 is adapted to cover a portion of a bat 901 (e.g., a handle of a baseball bat). Enclosure 900 may be the same as or similar to enclosure 300 of FIGS. 2A-2D, enclosure 450 of FIGS. 3A-3I, or enclosure 800 of FIGS. 7A-7B, except as otherwise described below.

Enclosure 900 includes a flexible panel 902 and a closure system 904. Flexible panel 902 includes a first panel edge 906 and an opposite second panel edge 908 spaced apart from first panel edge 906. Flexible panel 902 includes a central axis 910 extending longitudinally between a third panel edge 912 and a fourth panel edge 914. Central axis 910 of flexible panel 902 is aligned with a longitudinal axis of bat 901.

Closure system 904 includes a plurality of tabs 920 extending from each of first panel edge 906 and second panel edge 908. Plurality of tabs 920 are adapted to at least partially overlap in the closed position. Plurality of tabs 920 include a first or starting tab 922 positioned adjacent to first panel edge 906, and a locking tab 930 positioned adjacent to second panel edge 908.

As best shown in FIG. 8B, plurality of tabs 920 are at least partially overlapped such that a portion of distal ends 944 of each of the plurality of tabs 920 are covered by an adjacent tab. Distal end 944 of locking tab 930 is not covered by an adjacent tab.

Figure 9:
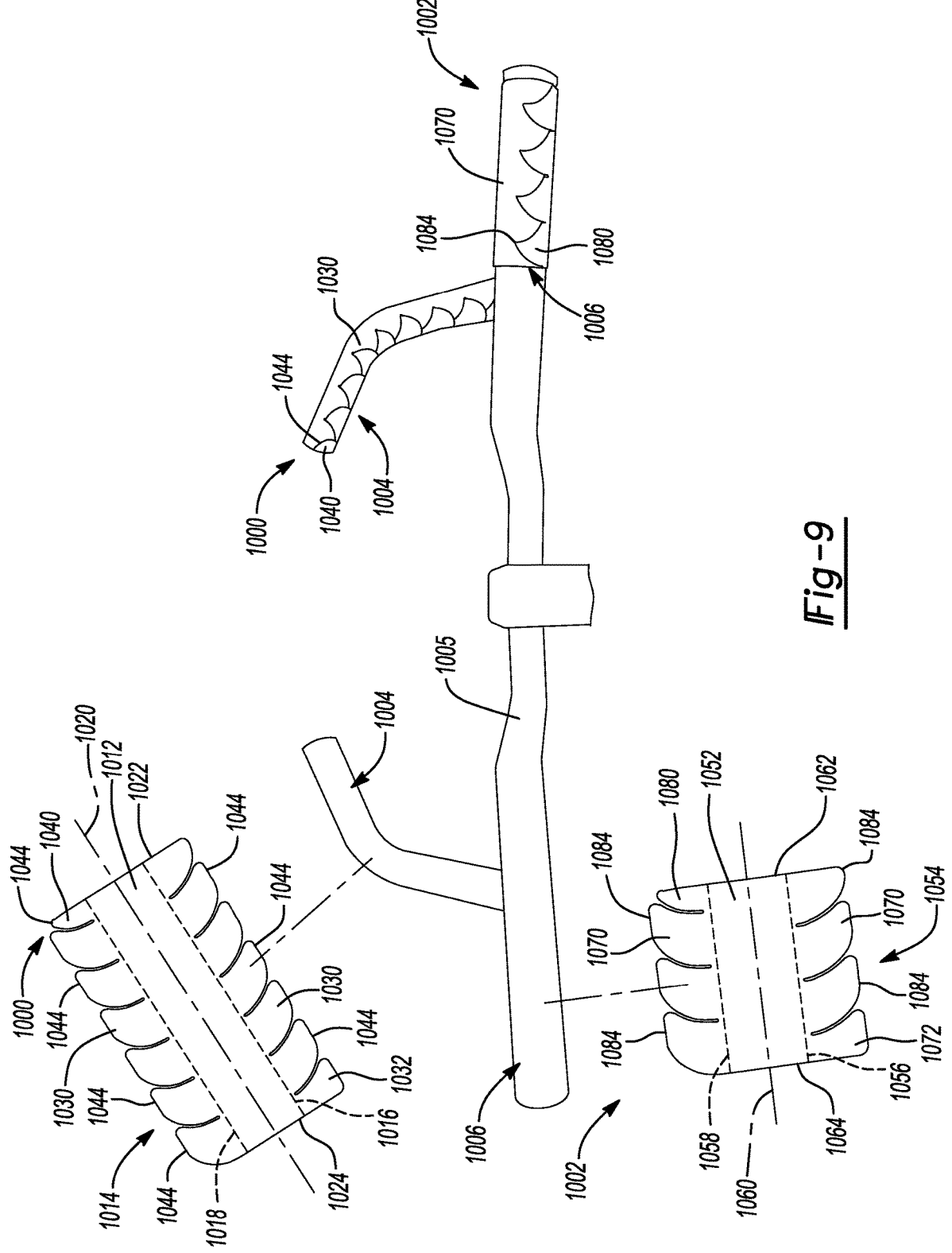
FIG. 9 shows an enclosure including a closure system.

With reference to FIG. 9, a first enclosure 1000 and a second enclosure 1002 are each adapted to move between a first or open position to a second or closed position to cover a first portion 1004 of a handlebar 1005 and a second portion 1006 of handlebar 1005, respectively. First enclosure 1000 and second enclosure 1002 may be the same as or similar to enclosure 300 of FIGS. 2A-2D, enclosure 450 of FIGS. 3A-3I, enclosure 800 of FIGS. 7A-7B, and enclosure 900 of FIGS. 8A-8B, except as otherwise described below.

First enclosure 1000 includes a first flexible panel 1012 and a first closure system 1014. First flexible panel 1012 includes a first panel edge 1016 and an opposite second panel edge 1018 spaced apart from first panel edge 1016. First flexible panel 1012 includes a first central axis 1020 extending longitudinally between a third panel edge 1022 and an opposite fourth panel edge 1024. First central axis 1020 of first flexible panel 1012 is aligned with first portion 1004 of handlebar 1005.

First closure system 1014 includes a first plurality of tabs 1030 extending from each of first panel edge 1016 and second panel edge 1018. First plurality of tabs 1030 are adapted to at least partially overlap in the closed position. First plurality of tabs 1030 include a first starting tab 1032 positioned adjacent to first panel edge 1016, and a first locking tab 1040 positioned adjacent to second panel edge 1018. In the closed position, first plurality of tabs 1030 are at least partially overlapped such that a portion of first ends 1044 of each of the first plurality of tabs 1030 are covered by an adjacent tab. First end 1044 of first locking tab 1040 is not covered by an adjacent tab.

Second enclosure 1002 includes a second flexible panel 1052 and a second closure system 1054. Second flexible panel 1052 includes a fifth panel edge 1056 and an opposite sixth panel edge 1058 spaced apart from fifth panel edge 1056. Second flexible panel 1052 includes a second central axis 1060 extending longitudinally between a seventh panel edge 1062 and an opposite eighth panel edge 1064. Second central axis 1060 of second flexible panel 1062 is aligned with a longitudinal axis of second portion 1006 of handlebar 1005.

Second closure system 1054 includes a second plurality of tabs 1070 extending from each of fifth panel edge 1056 and sixth panel edge 1058. Second plurality of tabs 1070 are adapted to at least partially overlap in the closed position. Second plurality of tabs 1070 include a second starting tab 1072 positioned adjacent to fifth panel edge 1056, and a second locking tab 1080 positioned adjacent to sixth panel edge 1058. In the closed position, second plurality of tabs 1070 are at least partially overlapped such that a portion of second ends 1084 of each of the second plurality of tabs 1070 are covered by an adjacent tab. Second end 1084 of second locking tab 1080 is not covered by an adjacent tab.

Figures 10A, 10B:
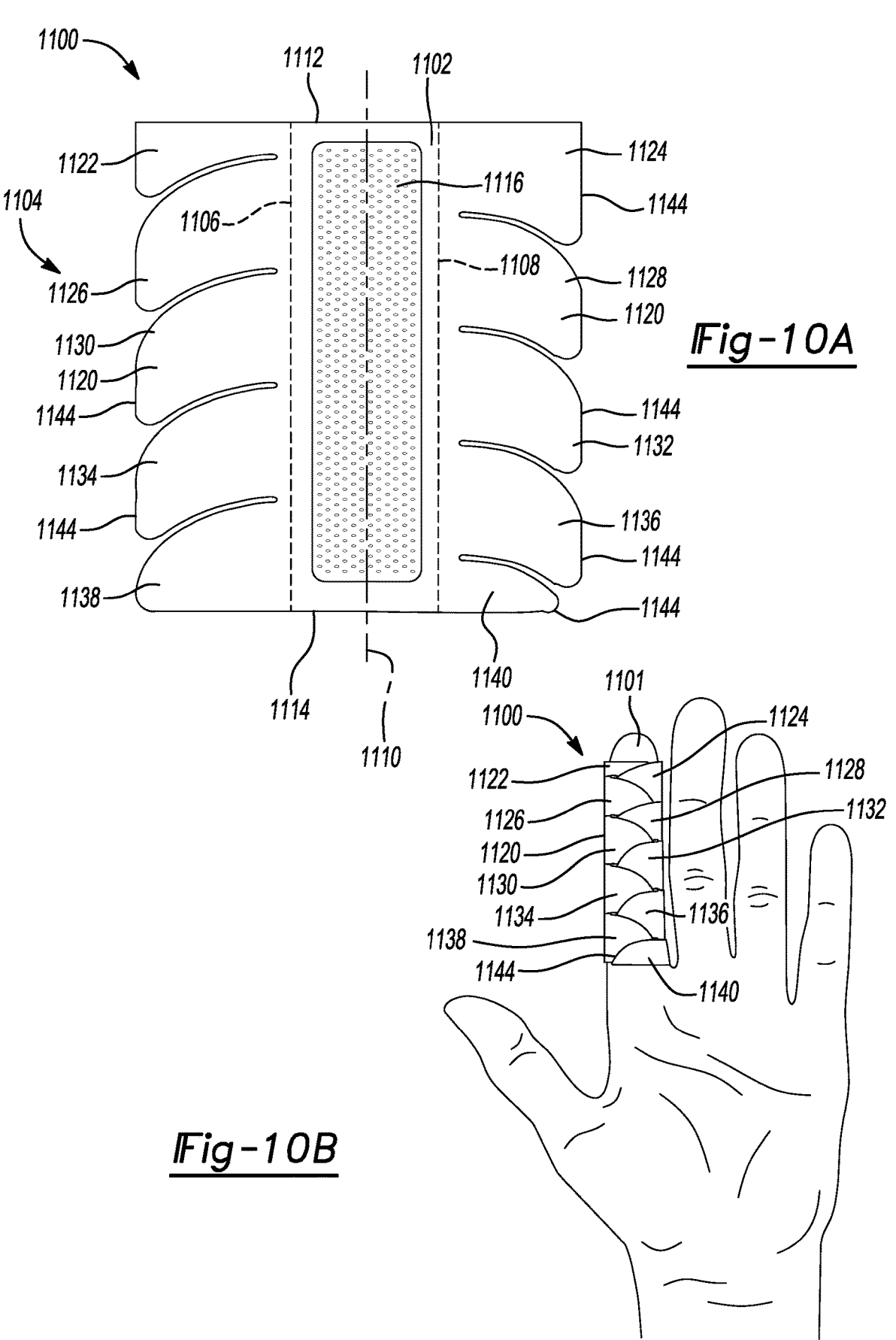
FIGS. 10A-10B show another enclosure including a closure system movable between a first position (FIG. 10A) and a second position (FIG. 10B)

Referring to FIGS. 10A-10B, an enclosure 1100 is adapted to move between a first or open position (FIG. 10A) to a second or closed position (FIG. 10B) to cover a body appendage. Specifically, enclosure 1100 is adapted to cover a portion of a finger 1101 (FIG. 10B). Enclosure 1100 includes a flexible panel 1102 and a closure system 1104. Enclosure 1100 may be the same as or similar to enclosure 300 of FIGS. 2A-2D and 450 of FIGS. 3A-3I except as otherwise described below.

Flexible panel 1102 includes a first panel edge 1106 and an opposite second panel edge 1108 spaced apart from first panel edge 1106. Flexible panel 1102 includes a central axis 1110 extending longitudinally between a third panel edge 1112 and an opposite fourth panel edge 1114. Flexible panel 1102 may include a pad 1116 (e.g., a sterile pad, fabric and/or cushion material) disposed between first panel edge 1106 and second panel edge 1108. Pad 1116 may increase a user's comfort by cushioning finger 1101 when enclosure 1100 is in the closed position.

Closure system 1104 includes a plurality of tabs 1120 extending from each of first panel edge 1106 and second panel edge 1108. Plurality of tabs 1120 includes a first or starting tab 1122 positioned adjacent to first panel edge 1106 (e.g., near third panel edge 1112), a second tab 1124 positioned adjacent to second panel edge 1108, a third tab 1126 positioned adjacent to first panel edge 1106, a fourth tab 1128 positioned adjacent to second panel edge 1108, a fifth tab 1130 positioned adjacent to first panel edge 1106, a sixth tab 1132 positioned adjacent to second panel edge 1108, a seventh tab 1134 positioned adjacent to first panel edge 1106, an eighth tab 1136 positioned adjacent to second panel edge 1108, a ninth tab 1138 positioned adjacent to first panel edge 1106, and a locking tab 1140 positioned adjacent to second panel edge 1108 (e.g., near fourth panel edge 1114).

In the closed position (FIG. 10B), central axis 1110 of flexible panel 1102 is aligned with a longitudinal axis of finger 1101. Plurality of tabs 1120 are at least partially overlapped such that distal ends 1144 (FIG. 10A) of each of the plurality of tabs 1120 are covered by an adjacent tab. Starting tab 1122 contacts a surface of finger 1101. Second tab 1124 contacts at least a portion of starting tab 1122. Third tab 1126 contacts at least a portion of second tab 1124. Fourth tab 1128 contacts at least a portion of third tab 1126. Fifth tab 1130 contacts at least a portion of fourth tab 1128. Sixth tab 1132 contacts at least a portion of fifth tab 1130. Seventh tab 1134 contacts at least a portion of sixth tab 1132. Eighth tab 1136 contacts at least a portion of seventh tab 1134. Ninth tab 1138 contacts at least a portion of eighth tab 1136. Locking tab 1140 contacts at least a portion of ninth tab 1138. Distal end 1144 of locking tab 1140 is not covered by an adjacent tab (FIG. 10B).

With reference to FIG. 11, an enclosure 1200 is adapted to move between a first or open position to a second or closed position (not shown) to cover a body appendage. For example, enclosure 1200 may be adapted to cover a finger, wrist, arm, elbow, leg, ankle, and/or toe. Enclosure 1200 may be the same as or similar to enclosure 1100 of FIGS. 10A-10B except as otherwise described below.

Enclosure 1200 includes a flexible panel 1202 and a closure system 1204. Flexible panel 1202 includes a first panel edge 1206 and an opposite second panel edge 1208 spaced apart from first panel edge 1206. Flexible panel 1202 may include a pad 1216 disposed between first panel edge 1206 and second panel edge 1208.

Closure system 1204 includes a plurality of tabs 1220 extending from each of first panel edge 1206 and second panel edge 1208. Plurality of tabs 1220 are adapted to at least partially overlap in the closed position. Plurality of tabs 1220 includes a first or starting tab 1222 positioned adjacent to first panel edge 1206, a second tab 1224 positioned adjacent to second panel edge 1208, a third tab 1226 positioned adjacent to first panel edge 1206, a fourth tab 1228 positioned adjacent to second panel edge 1208, and a locking tab 1230 positioned adjacent to first panel edge 1206.

With reference to FIG. 12, an enclosure 1300 is adapted to move between a first or open position to a second or closed position (not shown) to cover a body appendage. For example, enclosure 1300 may be adapted to cover a finger, wrist, arm, elbow, leg, ankle, and/or toe. Enclosure 1300 may be the same as or similar to enclosure 1100 of FIGS. 10A-10B or enclosure 1200 of FIG. 11 except as otherwise described below.

Enclosure 1300 includes a flexible panel 1302 and a closure system 1304. Flexible panel 1302 includes a first panel edge 1306 and an opposite second panel edge 1308 spaced apart from first panel edge 1306. Flexible panel 1302 may include a pad 1316 disposed between first panel edge 1306 and second panel edge 1308.

Closure system 1304 includes a plurality of tabs 1320 extending from each of first panel edge 1306 and second panel edge 1308. Plurality of tabs 1320 are adapted to at least partially overlap in the closed position. Plurality of tabs 1320 include a first or starting tab 1322 positioned adjacent to second panel edge 1308, a second tab 1324 positioned adjacent to first panel edge 1306, a third tab 1326 positioned adjacent to second panel edge 1308, and a locking tab 1328 positioned adjacent to first panel edge 1306.

With reference to FIG. 13, an enclosure 1400 is adapted to move between a first or open position to a second or closed position (not shown) to cover a body appendage. For example, enclosure 1400 may be adapted to cover a finger, wrist, arm, elbow, leg, ankle, and/or toe. Enclosure 1400 may be the same as or similar to enclosure 1100 of FIGS. 10A-10B except as otherwise described below.

Enclosure 1400 includes a flexible panel 1402 and a closure system 1404. Flexible panel 1402 includes a first panel edge 1406 and an opposite second panel edge 1408 spaced apart from first panel edge 1406. Flexible panel 1402 includes a third panel edge 1410 and an opposite fourth panel edge 1412. Flexible panel 1402 may include a pad 1416 disposed between first panel edge 1406 and second panel edge 1408.

Closure system 1404 includes a plurality of tabs 1420 extending from each of first panel edge 1406 and second panel edge 1408. Plurality of tabs 1420 are adapted to at least partially overlap in the closed position. Plurality of tabs 1420 include a first or starting tab 1422 positioned adjacent to first panel edge 1406 (e.g., near fourth panel edge 1412), a second tab 1424 positioned adjacent to second panel edge 1408, a third tab 1426 positioned adjacent to first panel edge 1406, a fourth tab 1428 positioned adjacent to second panel edge 1408, a fifth tab 1430 positioned adjacent to first panel edge 1406, a sixth tab 1432 positioned adjacent to second panel edge 1408, a seventh tab 1434 positioned adjacent to first panel edge 1406, an eighth tab 1436 positioned adjacent to second panel edge 1408, a ninth tab 1438 positioned adjacent to first panel edge 1406, and a locking tab 1440 positioned adjacent to second panel edge 1408 (e.g., near third panel edge 1410).

As discussed above, in some configurations, an enclosure may include one or more splints, such as to provide enhanced support to an object covered by enclosure. Referring to FIGS. 14A-14B, an enclosure 1500 is adapted to move between a first or open position to a second or closed position (not shown) to cover a body appendage. Specifically, enclosure 1500 may be adapted to cover a wrist 1501 (FIG. 14B). Enclosure 1500 may be the same as or similar to enclosure 300 of FIGS. 2A-2D or enclosure 450 of FIGS. 3A-3I except as otherwise described below.

Enclosure 1500 includes a flexible panel 1502 and a closure system 1504. Flexible panel 1502 includes a first panel edge 1506 and an opposite second panel edge 1508 spaced apart from first panel edge 1506. Flexible panel 1502 includes a central axis 1510 extending longitudinally between a third panel edge 1512 and a fourth panel edge 1514. As shown in FIG. 15B, central axis 1510 of flexible panel 1502 is aligned with a longitudinal axis of wrist 1501. Flexible panel 1502 may include a first splint 1516 positioned adjacent to first panel edge 1506 and a second splint 1518 positioned adjacent to second panel edge 1508. First splint 1516 and second splint 1518 may provide support to wrist 1501, such as when enclosure 1500 is in closed position.

Closure system 1504 includes a plurality of tabs 1520 extending from each of first panel edge 1506 and second panel edge 1508. Plurality of tabs 1520 are adapted to at least partially overlap in the closed position. Plurality of tabs 1520 include a first or starting tab 1522 positioned adjacent to first panel edge 1506 (e.g., near fourth panel edge 1514) and a locking tab 1540 positioned adjacent to second panel edge 1508 (e.g., near third panel edge 1512).

With reference to FIG. 15, an enclosure 1600 is adapted to move between a first or open position to a second or closed position (not shown) to cover a body appendage. Specifically, enclosure 1600 may be adapted to cover a wrist (not shown). Enclosure 1600 may be the same as or similar to enclosure 1500 of FIGS. 14A-14B, except as otherwise described below.

Enclosure 1600 includes a flexible panel 1602 and a closure system 1604. Flexible panel 1602 includes a first panel edge 1606 and an opposite second panel edge 1608 spaced apart from first panel edge 1606. Flexible panel 1600 also includes a third panel edge 1612 and an opposite fourth panel edge 1614. Flexible panel 1602 may include a first splint 1616 positioned adjacent to first panel edge 1606 and a second splint 1618 positioned adjacent to second panel edge 1608.

Closure system 1604 includes a plurality of tabs 1620 extending from each of first panel edge 1606 and second panel edge 1608. Plurality of tabs 1620 are adapted to at least partially overlap in the closed position. Plurality of tabs 1620 include a first or starting tab 1622 positioned adjacent to first panel edge 1606 (e.g., near third panel edge 1612) and a locking tab 1640 positioned adjacent to second panel edge 1608 (e.g., near fourth panel edge 1614).

Figures 16A, 16B, 16C:
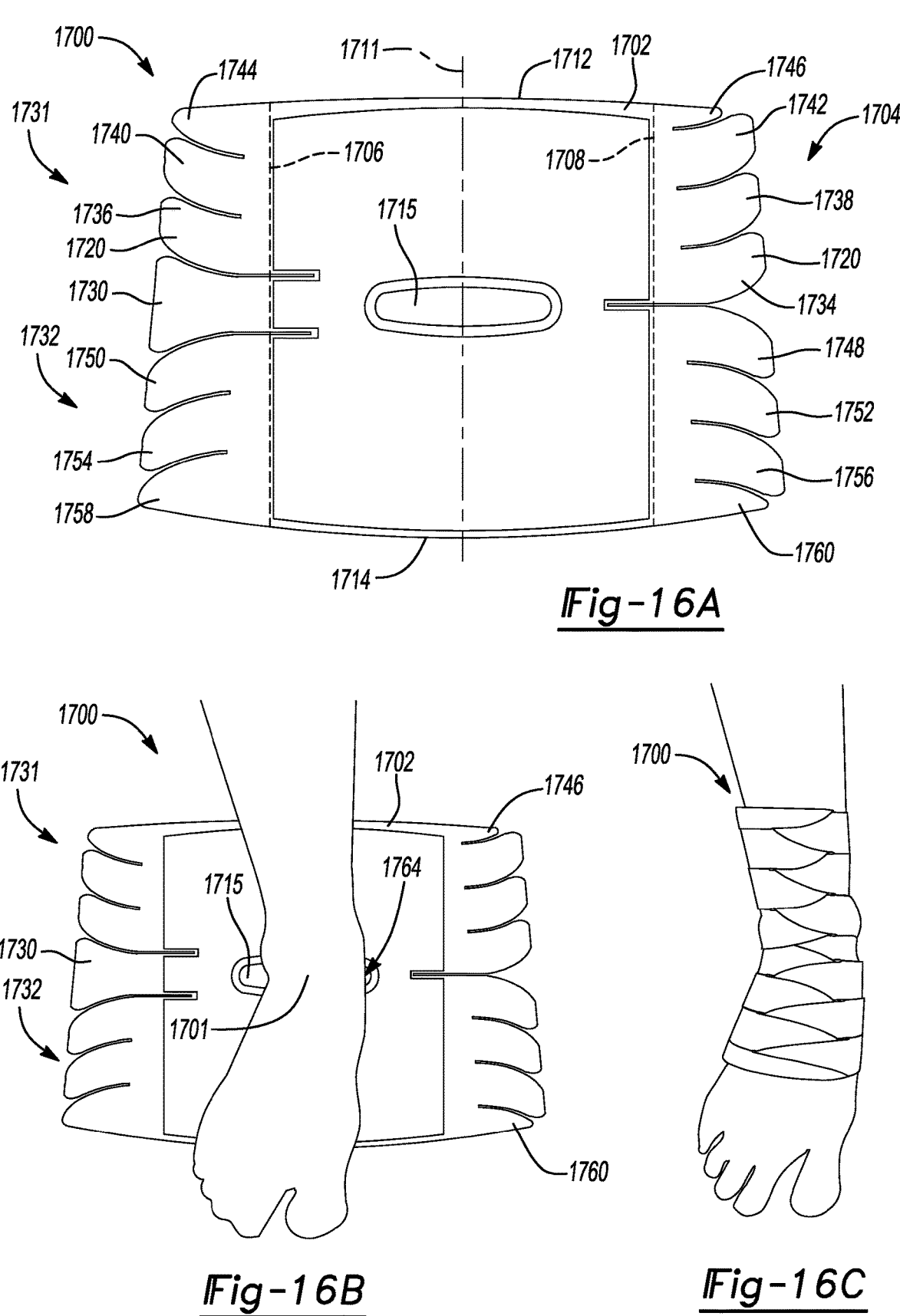
FIGS. 16A-16C show another enclosure including a closure system movable between a first position (FIGS. 16A-16B) and a second position (FIG. 16C)

As discussed above, in some configurations, an enclosure may include one or more apertures, such as to receive a portion of an object therethrough. Referring to FIGS. 16A-

16C, an enclosure 1700 is adapted to move between a first or open position (FIGS. 16A-16B) to a second or closed position (FIG. 16C) to cover a body appendage. Specifically, enclosure 1700 may be adapted to cover an ankle 1701 (FIG. 16B). Enclosure 1700 may be the same as or similar to enclosure 710 of FIGS. 6A-6H, except as otherwise described below.

Enclosure 1700 includes a flexible panel 1702 and a closure system 1704. Flexible panel 1702 includes a first panel edge 1706 and an opposite second panel edge 1708 spaced apart from first panel edge 1706. A central axis 1711 of flexible panel 1702 extends in a first or longitudinal direction between a third panel edge 1712 and a fourth panel edge 1714.

Flexible panel 1702 may define an aperture 1715. Aperture 1715 may be a slot elongated in a second or lateral direction. Aperture 1715 may be disposed in the center of flexible panel 1702 in between first panel edge 1706 and second panel edge 1708, and in between third panel edge 1712 and fourth panel edge 1714.

Closure system 1704 includes a plurality of tabs 1720 extending from each of the first panel edge 1706 and second panel edge 1708 in the second direction. Plurality of tabs 1720 includes a first or starting tab 1730, a first or upper portion of tabs 1731 and a second or lower portion of tabs 1732. Starting tab 1730 is positioned adjacent to first panel edge 1706. Starting tab 1730 may be aligned with aperture 1715.

First portion of tabs 1731 includes a second tab 1734 positioned adjacent to second panel edge 1708, a third tab 1736 positioned adjacent to first panel edge 1706, a fourth tab 1738 positioned adjacent to second panel edge 1708, a fifth tab 1740 positioned adjacent to first panel edge 1706, a sixth tab 1742 positioned adjacent to second panel edge 1708, a seventh tab 1744 positioned adjacent to first panel edge 1706, and a first locking tab 1746 positioned adjacent to second panel edge 1708. First locking tab 1746 may be positioned near third panel edge 1712.

Second portion of tabs 1732 includes an eighth tab 1748 positioned adjacent to second panel edge 1708, a ninth tab 1750 positioned adjacent to first panel edge 1706, a tenth tab 1752 positioned adjacent to second panel edge 1708, an eleventh tab 1754 positioned adjacent to first panel edge 1706, a twelfth tab 1756 positioned adjacent to second panel edge 1708, a thirteenth tab 1758 positioned adjacent to first panel edge 1706, and a second locking tab 1760 positioned adjacent to second panel edge 1708. Second locking tab 1760 may be positioned near fourth panel edge 1714.

Central axis 1711 of flexible panel 1702 is aligned with a longitudinal axis of ankle 1701. As shown in FIG. 16B, in this position, a heel 1764 extends at least partially through aperture 1715. To move enclosure 1700 from the open position (FIGS. 16A-16B) to the closed position (FIG. 16C), after heel 1764 is engaged in aperture 1715, a user may cover or enclose ankle 1701 by wrapping starting tab 1730 around ankle in a first circumferential direction (see, e.g., first circumferential direction A of FIG. 6B). User may then wrap or braid the remaining of the plurality of tabs 1720 to interconnect first panel edge 1706 and second panel edge 1708. For example, user may wrap or braid the first portion of tabs 1731 in an upward direction (e.g., to cover a portion of a leg). Simultaneously or sequentially, user may wrap of braid the second portion of tabs 1732 in a downward direction (e.g., to cover a portion of a foot).

As shown in FIG. 16C, in the closed position, starting tab 1730 is at least partially covered by second tab 1734 of first portion of tabs 1731 and eighth tab 1748 of second portion of tabs 1732. Each of second tab 1734, third tab 1736, fourth tab 1738, fifth tab 1740, sixth tab 1742, seventh tab 1744, eighth tab 1748, ninth tab 1750, tenth tab 1752, eleventh tab 1754, twelfth tab 1754 and thirteenth tab 1758 are at least partially covered by an adjacent tab. First locking tab 1746 and second locking tab 1760 secure the plurality of tabs 1720 (i.e., first locking tab 1746 secures first portion of tabs 1731 and second locking stab 1748 secures second portion of tabs 1732).

In the configuration shown in FIGS. 16A-16C, enclosure 1700 is adapted to cover a portion of ankle 1701. By aligning starting tab 1730 with aperture 1715, user may maintain relative movement of the ankle, resulting in a comfortable wrap or brace. It is contemplated that in alternate configurations covering other objects (e.g., objects having moving parts such as a body appendage), the configuration (e.g., size, position, quantity, etc.) of aperture 1715, starting tab 1730, first portion 1731 of plurality of tabs 1720 and second portion 1732 of plurality of tabs 1720 may be tailored to properly secure the object.

With reference to FIGS. 17A-17B, an enclosure 1800 is adapted to move between a first or open position (FIG. 17A-17B) to a second or closed position (not shown) to cover a body appendage. Specifically, enclosure 1800 may be adapted to cover a knee 1801 (FIG. 17B). Enclosure 1800 may be the same as or similar to enclosure 710 of FIGS. 6A-61 or enclosure 1700 of FIGS. 16A-16C, except as otherwise described below.

Enclosure 1800 includes a flexible panel 1802 and a closure system 1804. Flexible panel 1802 includes a first panel edge 1806 and an opposite second panel edge 1808 spaced apart from first panel edge 1806. An axis 1811 of flexible panel 1802 extends in a first or longitudinal direction between a third panel edge 1812 and a fourth panel edge 1814.

Flexible panel 1802 may define an aperture 1815. As shown in the configuration of FIGS. 17A-17B, aperture 1815 may be generally circular in shape, although other shapes and sizes are possible. Aperture 1815 may be positioned near first panel edge 1806 in between third panel edge 1812 and fourth panel edge 1814.

Closure system 1804 includes a plurality of tabs 1820 extending from each of the first panel edge 1806 and second panel edge 1808 in the second direction. Plurality of tabs 1820 includes a first or starting tab 1830, a first or upper portion of tabs 1831 and a second or lower portion of tabs 1832. Starting tab 1830 is positioned adjacent to first panel edge 1806. Starting tab 1830 may be aligned with aperture 1815.

First portion of tabs 1831 includes a second tab 1834 positioned adjacent to second panel edge 1808, a third tab 1836 positioned adjacent to first panel edge 1806, a fourth tab 1838 positioned adjacent to second panel edge 1808, a fifth tab 1840 positioned adjacent to first panel edge 1806, a sixth tab 1842 positioned adjacent to second panel edge 1808, a seventh tab 1844 positioned adjacent to first panel edge 1806, and a first locking tab 1846 positioned adjacent to second panel edge 1808. First locking tab 1846 may be positioned near third panel edge 1812.

Second portion of tabs 1832 includes an eighth tab 1848 positioned adjacent to second panel edge 1808, a ninth tab 1850 positioned adjacent to first panel edge 1806, a tenth tab 1852 positioned adjacent to second panel edge 1808, an eleventh tab 1854 positioned adjacent to first panel edge 1806, a twelfth tab 1856 positioned adjacent to second panel edge 1808, a thirteenth tab 1858 positioned adjacent to first panel edge 1806, and a second locking tab 1860 positioned adjacent to second panel edge 1808. Second locking tab 1860 may be positioned near fourth panel edge 1814.

As shown in FIG. 17B, axis 1811 of flexible panel 1802 is aligned with a longitudinal axis of knee 1801. In this position, a portion of knee 1801 (e.g., a kneecap) extends at least partially through aperture 1815. To move enclosure 1800 from the open position (FIGS. 17A-17B) to the closed position (not shown), after knee 1801 is engaged in aperture 1815, a user may cover or enclose knee 1801 by wrapping flexible panel 1802 around the user's leg and subsequently wrapping starting tab 1830 around knee 1801 in a first circumferential direction (see, e.g., first circumferential direction A of FIG. 6B). User may then wrap or braid the remaining of the plurality of tabs 1820 to secure enclosure 1800 to leg. For example, user may wrap or braid the first portion of tabs 1831 in an upward direction (e.g., to cover a portion of a thigh). Simultaneously or sequentially, user may wrap of braid the second portion of tabs 1832 in a downward direction (e.g., to cover a portion of a calf).

In the configuration shown in FIGS. 17A-17B, enclosure 1800 is adapted to cover a portion of knee 1801, calf, and thigh. By aligning starting tab 1830 with aperture 1815, user may maintain relative movement of knee 1801 when enclosure 1800 is in the closed position, resulting in a comfortable wrap or brace.

Figures 18A, 18B, 18C:
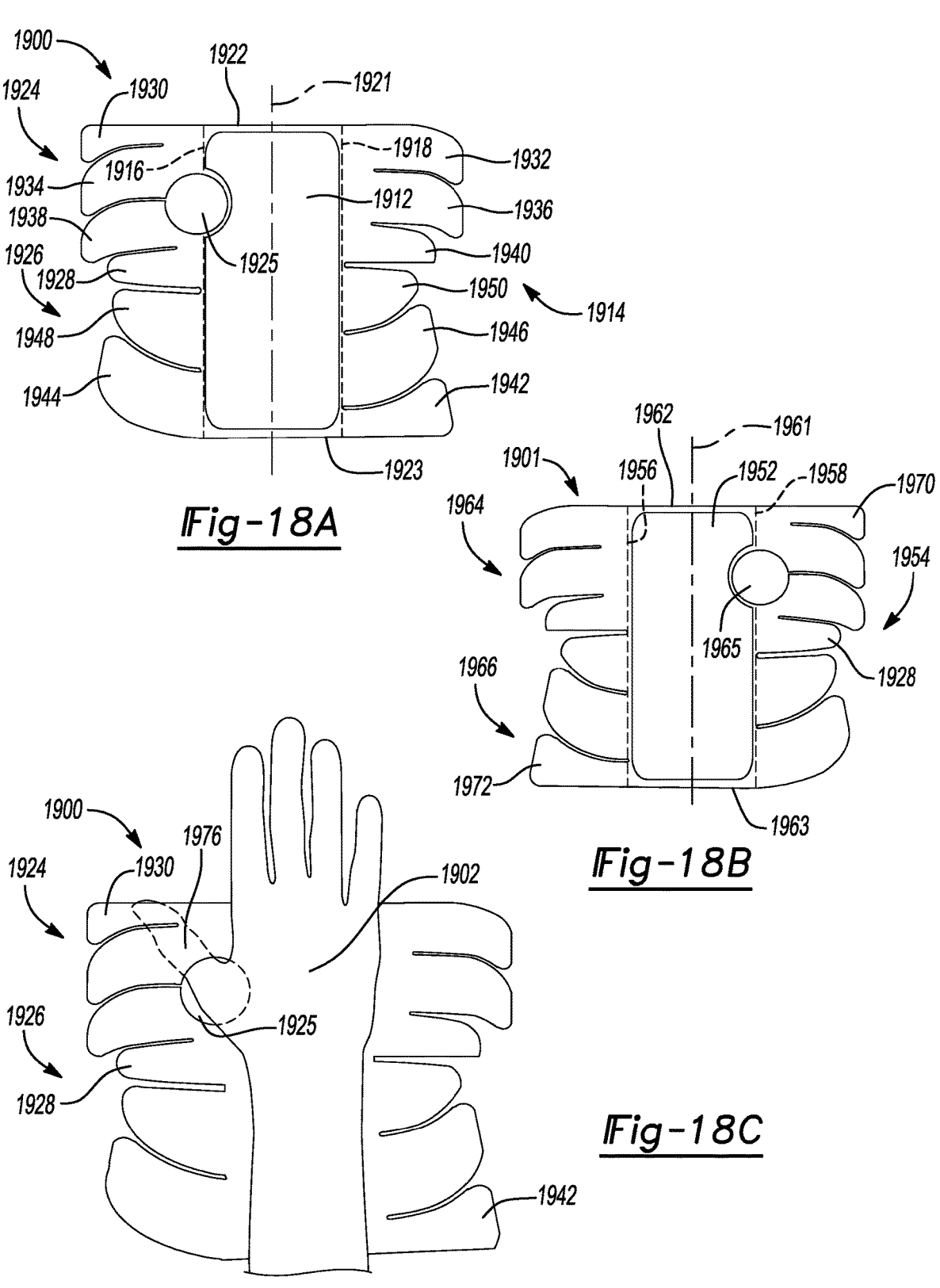
FIGS. 18A-18C show yet another enclosure including a closure system.

With reference to FIGS. 18A-18C, enclosures 1900 (FIGS. 18A and 18C) and 1901 (FIG. 18B) are adapted to move between a first or open position and a second or closed position to cover a body appendage. Specifically, enclosures 1900, 1901 may be adapted to cover a wrist 1902 (FIG. 18C). Enclosures 1900, 1901 may be the same as or similar to enclosure 610 of FIGS. 5A-5M, except as otherwise described below.

Referring to FIGS. 18A and 18C, enclosure 1900 includes a flexible panel 1912 and a closure system 1914. Flexible panel 1912 includes a first panel edge 1916 and an opposite second panel edge 1918 spaced apart from first panel edge 1916. A central axis 1921 of flexible panel 1912 extends in a first or longitudinal direction between a third panel edge 1922 and a fourth panel edge 1923.

Flexible panel 1912 may define an aperture 1925. Aperture 1925 may have a generally circular shape, although other shapes and sizes are contemplated. Aperture 1925 may be positioned adjacent to first panel edge 1916 near third panel edge 1922.

Closure system 1914 includes a first plurality of tabs 1924, a second plurality of tabs 1926, and a locking tab 1928. Second plurality of tabs 1926 may be spaced apart from first plurality of tabs 1924. The first and second plurality of tabs 1924, 1926 extend from each of first panel edge 1916 and second panel edge 1918 in a second or lateral direction.

First plurality of tabs 1924 includes a first starting tab 1930 positioned adjacent to first panel edge 1916 (e.g., near third panel edge 1922), a second tab 1932 positioned adjacent to second panel edge 1918, a third tab 1934 positioned adjacent to first panel edge 1916, a fourth tab 1936 positioned adjacent to second panel edge 1918, a fifth tab 1938 positioned adjacent to first panel edge 1916, and a sixth tab 1940 positioned adjacent to second panel edge 1918. Second plurality of tabs 1926 includes a second starting tab 1942 positioned adjacent to second panel edge 1918 (e.g., near fourth panel edge 1923), a seventh tab 1944 positioned adjacent to first panel edge 1916, an eighth tab 1946 positioned adjacent to second panel edge 1918, a ninth tab

1948 positioned adjacent to first panel edge 1916, and a tenth tab 1950 positioned adjacent to second panel edge 1918.

Locking tab 1928 is positioned adjacent to first panel edge 1916 between first plurality of tabs 1924 and second plurality of tabs 1926. Aperture 1925 is positioned adjacent to first panel edge 1916 between first starting tab 1930 and locking tab 1928.

Referring now to FIG. 18B, enclosure 1901 is the same as or similar to enclosure 1900 except as otherwise described below. Enclosure 1901 includes a flexible panel 1952 and a closure system 1954. Flexible panel 1952 includes a first panel edge 1956 and an opposite second panel edge 1958 spaced apart from first panel edge 1956. A central axis 1961 of flexible panel 1952 extends in a first or longitudinal direction between a third panel edge 1962 and a fourth panel edge 1963.

Flexible panel 1952 may define an aperture 1965. Aperture 1965 may be positioned adjacent to second panel edge 1918 near third panel edge 1962.

Closure system 1954 includes a first plurality of tabs 1964, a second plurality of tabs 1966, and a locking tab 1968. Second plurality of tabs 1966 may be spaced apart from first plurality of tabs 1964. The first and second plurality of tabs 1964, 1966 extend from each of first panel edge 1956 and second panel edge 1958 in a second or lateral direction. First plurality of tabs 1964 includes a first starting tab 1970 positioned adjacent to second panel edge 1958. Second plurality of tabs 1966 includes a second starting tab 1972 positioned adjacent to first panel edge 1956.

Locking tab 1968 is positioned adjacent to second panel edge 1958 between first plurality of tabs 1964 and second plurality of tabs 1966. Aperture 1965 is positioned adjacent to second panel edge 1958 between first starting tab 1970 and locking tab 1968.

With renewed reference to FIG. 18C, central axis 1911 of flexible panel 1912 of enclosure 1900 is aligned with a longitudinal axis of wrist 1902. In this position, a finger 1976 (e.g., a thumb) extends at least partially through aperture 1925. While FIG. 18C shows enclosure 1900 adapted to cover a lefthand wrist, it should be appreciated that enclosure 1901 is adapted to cover a righthand wrist.

To move enclosure 1900 from the open position to the closed position, after finger 1976 is engaged in aperture 1925, a user may cover or enclose wrist 1902 by wrapping first starting tab 1930 and/or second starting tab 1942 around wrist 1902. User may then wrap or braid the remaining of the first and second plurality of tabs 1924, 1926. For example, user may wrap or braid the first plurality of tabs 1924 in a downward direction (e.g., towards locking tab 1928). Simultaneously or sequentially, user may wrap or braid second portion of tabs 1926 in an upward direction (e.g., towards locking tab 1928). After the first and second plurality of tabs 1924, 1926, are wrapped or braided, user may wrap locking tab 1928 around the wrist to secure each of the first and second plurality of tabs 1924, 1926.

In some configurations, an object having a complex shape, such as footwear, apparel, luggage, etc. includes a closure system adapted to move between a first or open position and a second or closed position. Closure system may include a plurality of tabs extending from each of a first edge and a second edge of an object. Plurality of tabs is adapted to secure or interconnect first edge and second edge of object. For example, plurality of tabs may be interlocked or braided such that at least one of the plurality of tabs is adapted to simultaneously engage two other adjacent tabs, thus connecting first edge and second edge of object.

With reference to FIG. 19, a shoe 2000 includes a closure system 2002 moveable between a first or open position and a second or closed position. Shoe 2000 includes a first edge 2004 (e.g., a first side of shoe 2000) and a second edge 2006 (e.g., a second side of shoe 2000). A shoe tongue 2008 may be disposed between first edge 2004 and second edge 2006.

Closure system 2002 includes a plurality of tabs 2010 extending from each of first edge 2004 and second edge 2006. At least one of plurality of tabs 2010 is adapted to simultaneously engage two other adjacent tabs (e.g., in the closed position). Plurality of tabs 2010 includes a first tab 2012 positioned adjacent to first edge 2004, a second tab 2014 positioned adjacent to second edge 2006, and a third tab 2016 positioned adjacent to first edge 2004. First tab 2012 includes a first surface (not shown) and a second surface 2018 opposite the first surface. Second tab 2014 includes a third surface (not shown) and a fourth surface 2020 opposite the third surface. Third tab 2016 includes a fifth surface (not shown) and a sixth surface 2022 opposite the fifth surface. In the closed position, the third surface of second tab 2014 is removably attached to second surface 2018 of first tab 2012 and fourth surface 2020 of second tab 2014 is removably attached to fifth surface of third tab 2016. Plurality of tabs 2010 further includes a locking tab 2024 having a seventh surface (not shown) and an eighth surface 2026 opposite the seventh surface. In the closed position, the seventh surface of locking tab 2024 is removably attached to a surface of an adjacent tab and the eighth surface 2026 is uncovered by any adjacent tabs.

It is envisioned that in an alternate embodiment, the locking tab 1024 may be positioned at an opposite end (e.g., towards the top of the tongue 2008) and the order of the overlapping or braiding the tabs is reversed (i.e., starting towards the bottom of the tongue 2008 and ending with locking tab 1024). It is contemplated that a first portion of the plurality of tabs 2010 includes one of a plurality of hooks and a plurality of loops and a second portion of the plurality of tabs 2010 includes the other of the plurality of hooks and the plurality of loops. It is also contemplated that closure system 2002 includes more or less tabs, such as greater than or equal to 3 tabs, greater than or equal to 5 tabs, greater than or equal to 10 tabs, greater than or equal to 15 tabs, or optionally greater than or equal to 20 tabs.

In the closed position, closure system 2002 interconnects first edge 2004 and second edge 2006. In the example shown in FIG. 19, closure system connects wraps over tongue 2008 to connect first edge 2004 and second edge 2006. In this way, closure system 2002 reduces or eliminates the need for external fasteners such as shoelaces, zippers, buckles, buttons, single strap connectors, clasps, etc., to connect first edge 2004 and second edge 2006.

Figures 20, 21:
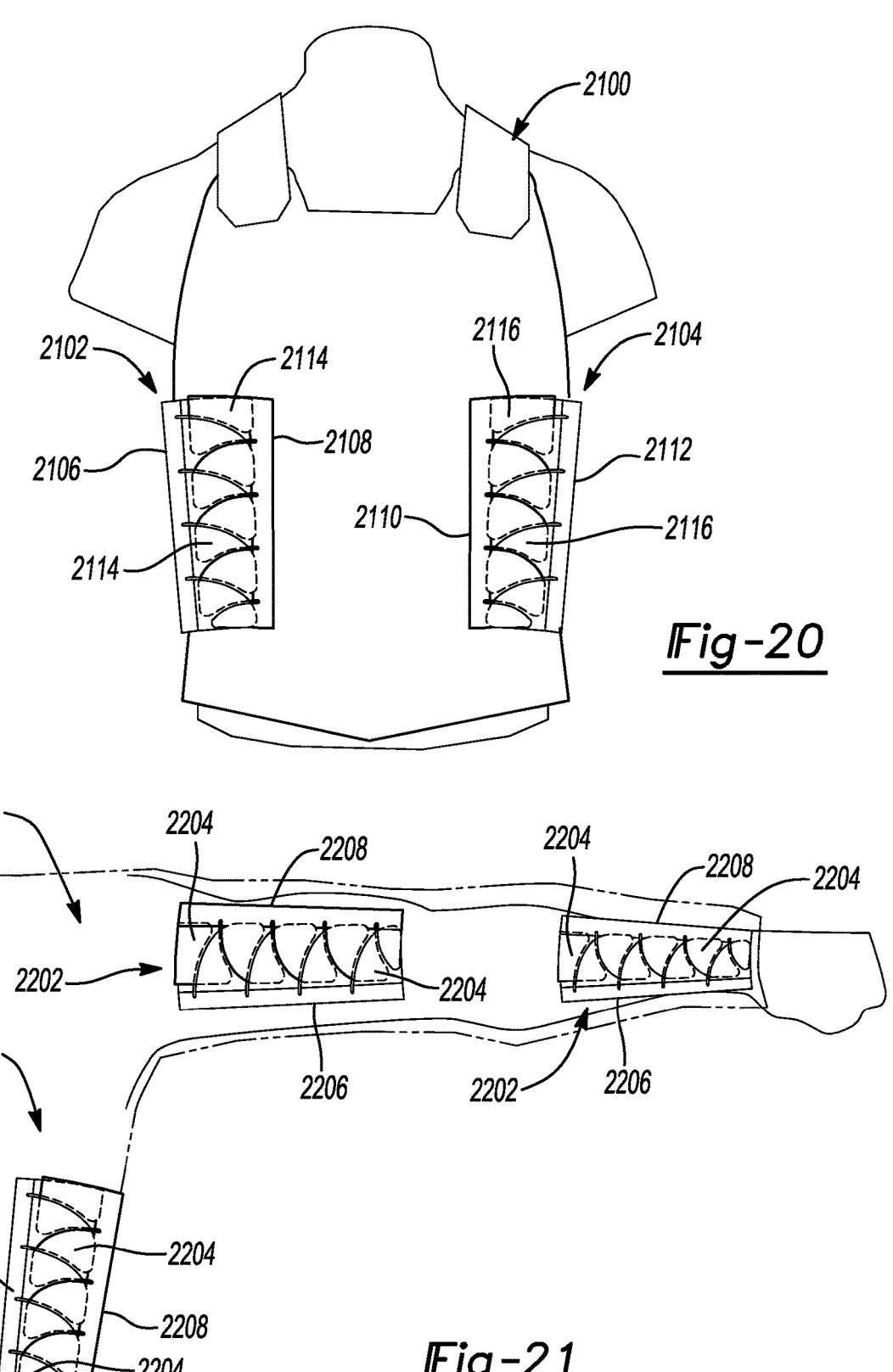
FIG. 20 shows a vest including a closure system in accordance with the present disclosure.
FIG. 21 shows apparel including a closure system in accordance with the present disclosure.

Referring to FIG. 20, a vest 2100 (e.g., a bullet proof vest) includes a first closure system 2102 and a second closure system 2104 moveable between a first or open position and a second or closed position. First closure system 2102 and second closure system 2104 may be the same as or similar to closure system 2002 of FIG. 20, except as otherwise described below.

Vest 2100 includes a first edge 2106, a second edge 2108, a third edge 2110, and a fourth edge 2112. First closure system 2102 is adapted to interconnect first edge 2106 and second edge 2108. Second closure system 2104 is adapted to interconnect third edge 2110 and fourth edge 2112.

First closure system 2102 includes a first plurality of tabs 2114 extending from each of first edge 2106 and second edge 2108. At least one of first plurality of tabs 2114 is adapted to simultaneously engage two other adjacent tabs (e.g., in the closed position) to connect first edge 2106 and second edge 2108.

Second closure system 2104 includes a second plurality of tabs 2116 extending from each of third edge 2110 and fourth edge 2112. At least one of second plurality of tabs 2116 is adapted to simultaneously engage two other adjacent tabs (e.g., in the closed position) to connect third edge 2110 and fourth edge 2112.

In this way, first closure system 2102 and second closure system 2104 secure the sides of vest 2100 (e.g., by connecting first edge 2016 to second edge 2108 and connecting third edge 2110 to fourth edge 2112) while reducing or eliminating the need for external fasteners (e.g., zippers, buckles, buttons, single strap connectors, clasps, etc.).

Referring to FIG. 21, an article of clothing 2200 (e.g., a shirt, jacket, etc.) includes one or more closure systems 2202 moveable between a first or open position and a second or closed position. One or more closure systems 2022 may be the same as or similar to closure system 2002 of FIG. 20, first closure system 2102 and/or second closure system 2104 of FIG. 20, except as otherwise described below.

Each of the one or more closure systems 2202 includes a plurality of tabs 2204 extending from a first edge 2206 and a second edge 2208 of article of clothing 2200. At least one of the plurality of tabs 2204 is adapted to simultaneously engage two adjacent tabs. In the closed position, each of the one or more closure systems 2202 may interconnect two edges of article of clothing 2200 (e.g., closure system 2202 may interconnect first edge 2206 and second edge 2208).

Figures 22A, 22B, 23A, 23B:
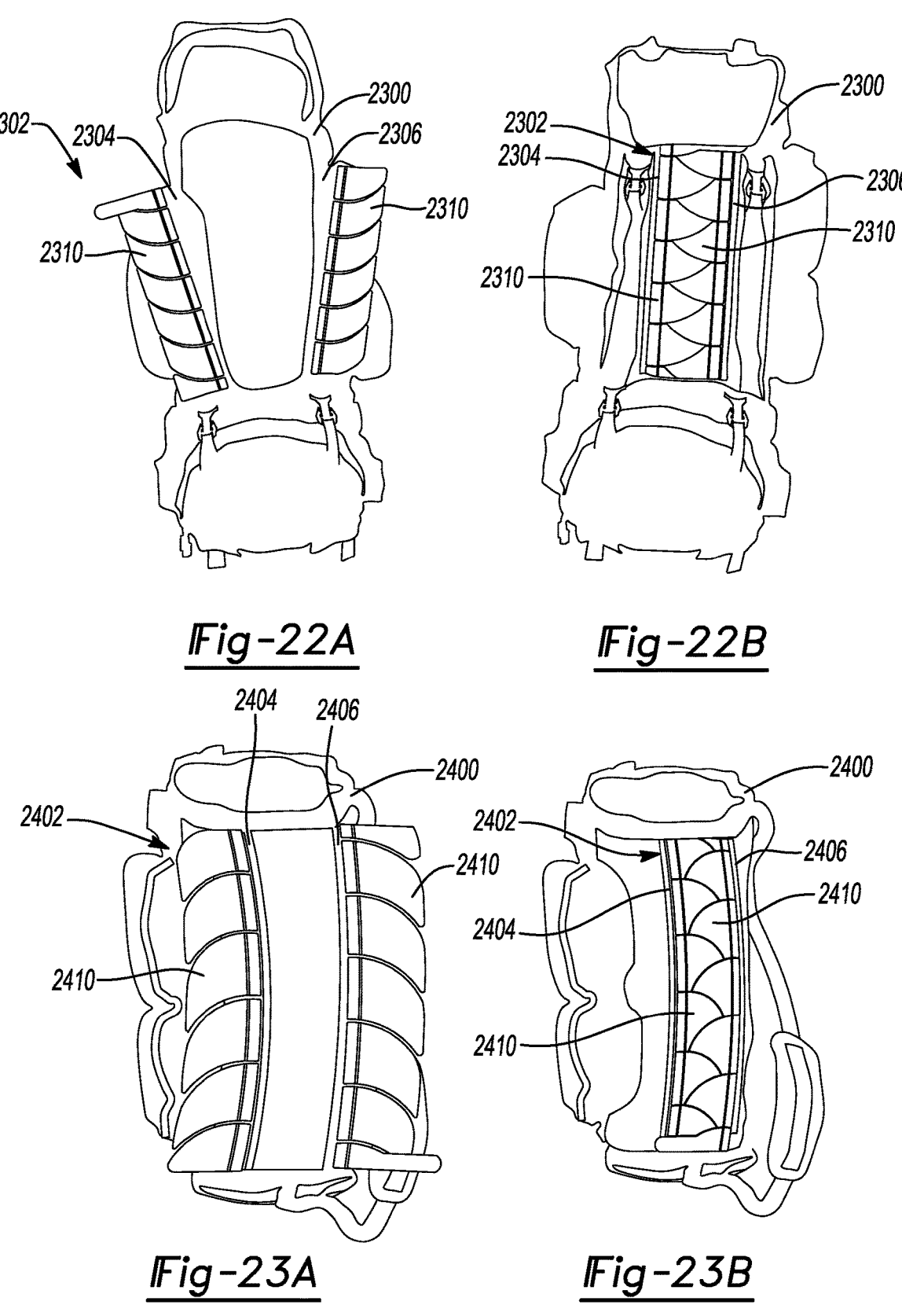
FIGS. 22A-22B show a backpack including a closure system movable between a first position (FIG. 22A) and a second position (FIG. 22B)
FIGS. 23A-23B show a duffle bag including a closure system movable between a first position (FIG. 23A) and a second position (FIG. 23B)

With reference to FIG. 22A-22B, a backpack 2300 includes a closure system 2302 moveable between a first or open position (FIG. 22A) and a second or closed position (FIG. 22B). While backpack 2300 is shown in the configurations of FIGS. 22A-22B, it is contemplated that other forms of luggage such as duffle bags, handbags, etc., could include closure system 2302. Closure system 2302 may be the same as or similar to closure system 2002 of FIG. 19, first closure system 2102 and/or second closure system 2104 of FIG. 20, and/or closure system 2202 of FIG. 21, except as otherwise described below.

Backpack 2300 includes a first edge 2304 (e.g., a first side of backpack 2300) and a second edge 2306 (e.g., a second side of backpack 2300). Closure system 2302 includes a plurality of tabs 2310 extending from each of first edge 2304 and second edge 2306. At least one of plurality of tabs 2310 is adapted to simultaneously engage two other adjacent tabs (e.g., in the closed position). Closure system 2302 interconnects first edge 2304 and second edge 2306. In this way, closure system 2302 reduces or eliminates the need for external fasteners such as zippers, buckles, buttons, single strap connectors, clasps, etc., to connect first edge 2304 and second edge 2306.

With reference to FIG. 23A-23B, a duffle bag 2400 includes a closure system 2402 moveable between a first or open position (FIG. 23A) and a second or closed position (FIG. 23B). Closure system 2402 may be the same as or similar to closure system 2302 of FIG. 22, except as otherwise described below.

Duffle bag 2400 includes a first edge 2404 (e.g., a first side of duffle bag 2400) and a second edge 2406 (e.g., a second side of duffle bag 2400). Closure system 2402 includes a plurality of tabs 2410 extending from each of first edge 2404 and second edge 2406. At least one of plurality of tabs 2410 is adapted to simultaneously engage two other adjacent tabs (e.g., in the closed position). Closure system 2402 interconnects first edge 2404 and second edge 2406. In this way, closure system 2402 reduces or eliminates the need for external fasteners such zippers, buckles, buttons, single strap connectors, clasps, etc. to connect first edge 2404 and second edge 2406.

In some configurations, an enclosure for covering an outer surface of an object includes a flexible panel moveable between a first position and a second position and a closure system including a plurality of tabs. A first portion of the plurality of tabs may extend from a surface of the flexible panel.

Figures 24A, 24B:
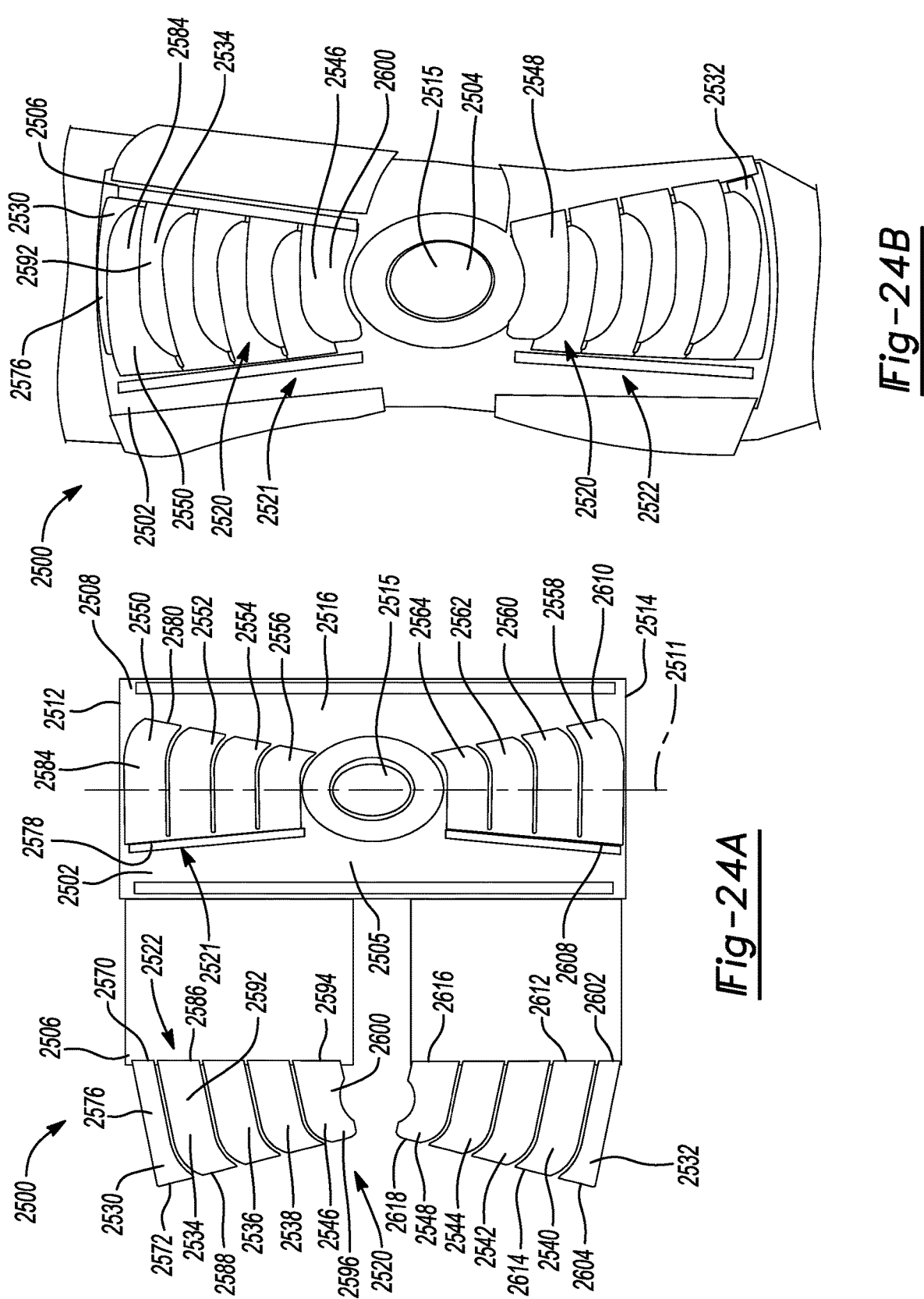
FIGS. 24A-24B show an enclosure including a closure system movable between a first position (FIG. 24A) and a second position (FIG. 24B in accordance with the present disclosure.

Referring now to FIGS. 24A-24B, enclosure 2500 includes a flexible panel 2502. Flexible panel 2502 is moveable between a first or open position (FIG. 24A) and a second or closed position (FIG. 24B). In the first position, flexible panel 2502 is relatively flat. In the second position, flexible panel 2502 is adapted to cover a portion of an object. For example, in the second position, flexible panel 2502 may wrap around a knee 2504 covering all or a portion of a leg and knee 2504.

Flexible panel 2502 includes a body 2505 extending between a first panel edge 2506 and an opposite second panel edge 2508. First panel edge 2506 is spaced apart from second panel edge 2508. A first axis 2511 may extend in a first or longitudinal direction between a third panel edge 2512 and an opposite fourth panel edge 2514. Body 2505 may define an aperture 2515 extending therethrough. Flexible panel 2502 includes a first or exterior surface 2516 and an opposite second or interior surface (not shown).

Flexible panel 2502 further includes a closure system 2520. Closure system 2520 includes a first plurality of tabs 2521 extending from first surface 2516 of flexible panel 2502. First plurality of tabs 2521 are disposed on first surface 2516 between first panel edge 2506 and second panel edge 2508. First plurality of tabs 2521 may be substantially aligned in the first direction (i.e., first plurality of tabs 2521 is aligned in first direction parallel to axis 2511) and extend laterally outward in a second direction. Closure system 2520 further includes a second plurality of tabs 2522 extending laterally from one of the first panel edge 2506 or second panel edge 2508 in the second direction. In the configuration of FIGS. 24A-24B, second plurality of tabs 2522 includes extends from first panel edge 2506. Second plurality of tabs 2522 may be axially offset from first plurality of tabs 2521 such that in the second position (FIG. 24B), at least one of the first plurality of tabs 2521 and second plurality of tabs 2522 is adapted to simultaneously engage with two other adjacent tabs.

Second plurality of tabs 2522 includes a first starting tab 2530, a second starting tab 2532, a second tab 2534, a third tab 2536, a fourth tab 2538, a fifth tab 2540, a sixth tab 2542, a seventh tab 2544, a first locking tab 2546, and a second locking tab 2548. First plurality of tabs 2521 includes an eighth tab 2550, a ninth tab 2552, a tenth tab 2554, an eleventh tab 2556, a twelfth tab 2558, a thirteenth tab 2560, a fourteenth tab 2562 and a fifteenth tab 2564. Aperture 2515 may be disposed between eleventh tab 2556 and fifteenth tab 2564.

First starting tab 2530 includes a first end 2570 positioned adjacent to first panel edge 2506 and extends outwardly from first panel edge 2506 to a first distal end 2572. First starting tab 2530 is positioned near third panel edge 2512. First starting tab 2530 includes a first surface (not shown) and a second surface 2576 opposite first surface.

Eighth tab 2550 includes a second end 2678 disposed on first surface 2516 and extends outwardly from flexible panel 2502 to a second distal end 2580 (e.g., towards second panel edge 2508). Eighth tab 2550 is positioned near third panel edge 2512. Eighth tab 2550 includes a third surface (not shown) and an opposite fourth surface 2584. Ninth tab 2552, tenth tab 2554, and eleventh tab 2556 may be the same as or similar to eighth tab 2550.

Second tab 2534 includes a third end 2586 positioned adjacent to first panel edge 2506 and extends outwardly from first panel edge 2506 to a third distal end 2588. Second tab 2534 includes a fifth surface (not shown) and a sixth surface 2592 opposite fifth surface. Third tab 2536 and fourth tab 2538 may be the same as or similar to second tab 2534.

First locking tab 2546 includes a fourth end 2594 positioned adjacent to first panel edge 2506 and extends outwardly from first panel edge 2506 to a fourth distal end 2596. First locking tab 2546 includes a seventh surface (not shown) and an eighth surface 2600 opposite seventh surface.

Second starting tab 2532 includes a fifth end 2602 positioned adjacent to first panel edge 2506 and extends outwardly from first panel edge 2506 to a fifth distal end 2604. Second starting tab 2532 may be the same as or similar to first starting tab 2530 except that second starting tab 2532 is positioned near fourth panel edge 2514.

Twelfth tab 2558 includes a sixth end 2608 disposed on exterior surface 2516 and extends outwardly from flexible panel 2502 to a sixth distal end 2610 (e.g., towards second panel edge 2508). Twelfth tab 2558 may be the same as or similar to eighth tab 2550 except that twelfth tab 2558 is positioned near fourth panel edge 2514. Thirteenth tab 2560, fourteenth tab 2562, and fifteenth tab 2564 may be the same as or similar to twelfth tab 2558.

Fifth tab 2540 includes a seventh end 2612 positioned adjacent to first panel edge 2506 and extends outwardly from first panel edge 2506 to a seventh distal end 2614. Sixth tab 2542 and seventh tab 2544 may be the same as or similar to fifth tab 2540.

Second locking tab 2548 includes an eighth end 2616 positioned adjacent to first panel edge 2506 and extends outwardly from first panel edge 2506 to an eighth distal end 2618. Second locking tab 2548 may be the same as or similar to first locking tab 2546 except that second locking tab 2548 is positioned on an opposite side of aperture 2515.

To move enclosure 2500 from first position (FIG. 24A) to second position (FIG. 24B), user engages knee 2504 with flexible panel 2502 such that knee 2504 extends at least partially through aperture 2515. When knee 2504 is engaged in aperture 2515, first axis 2511 of flexible panel 2402 is aligned with a longitudinal axis of knee 2504.

In the second position (FIG. 24B), flexible panel 2502 is wrapped around user's leg such that second surface of flexible panel 2502 contacts user's knee 2504. First surface of first starting tab 2530 contacts exterior surface 2516 of flexible panel 2502. Eighth tab 2550 is wrapped or interlocked with first starting tab 2530 to contact at least a portion of first starting tab 2530. Specifically, third surface of eighth tab 2550 is removably attached to second surface 2576 of first starting tab 2530. Second tab 2534 is wrapped or interlocked with eighth tab 2550 to contact at least a portion of eighth tab 2550. Fourth surface 2584 of eighth tab 2550 is removably attached to third surface of second tab 2534. Ninth tab 2552, third tab 2534, tenth tab 2554, fourth tab 2538, and eleventh tab 2556 are similarly wrapped such that a portion of each of the ninth, third, tenth, fourth, and eleventh tabs 2552, 2534, 2554, 2538, 2556 simultaneously engages two other adjacent tabs. First locking tab 2546 is wrapped or interlocked with eleventh tab 2556 to contact at least a portion of eleventh tab 2556. Eighth surface 2600 of first locking tab 2546 is not covered by any other tab.

Similarly, second starting tab 2532 contacts first surface 2516 of flexible panel 2502. Twelfth tab 2558 is wrapped or interlocked with second starting tab 2532 to contact at least a portion of second starting tab 2532. Fifth tab 2540 is wrapped or interlocked with twelfth tab 2558 to contact at least a portion of twelfth tab 2558. Thirteenth tab 2560, sixth tab 2542, fourteenth tab 2562, seventh tab 2544, and fifteenth tab 2564 are similarly wrapped such that a portion of each of the thirteenth, sixth, fourteenth, seventh, and fifteenth tabs 2560, 2542, 2562, 2544, 2564 simultaneously engages two other adjacent tabs. Second locking tab 2548 is wrapped or interlocked with fifteenth tab 2564 to contact at least a portion of fifteenth tab 2564.

Figure 25A:
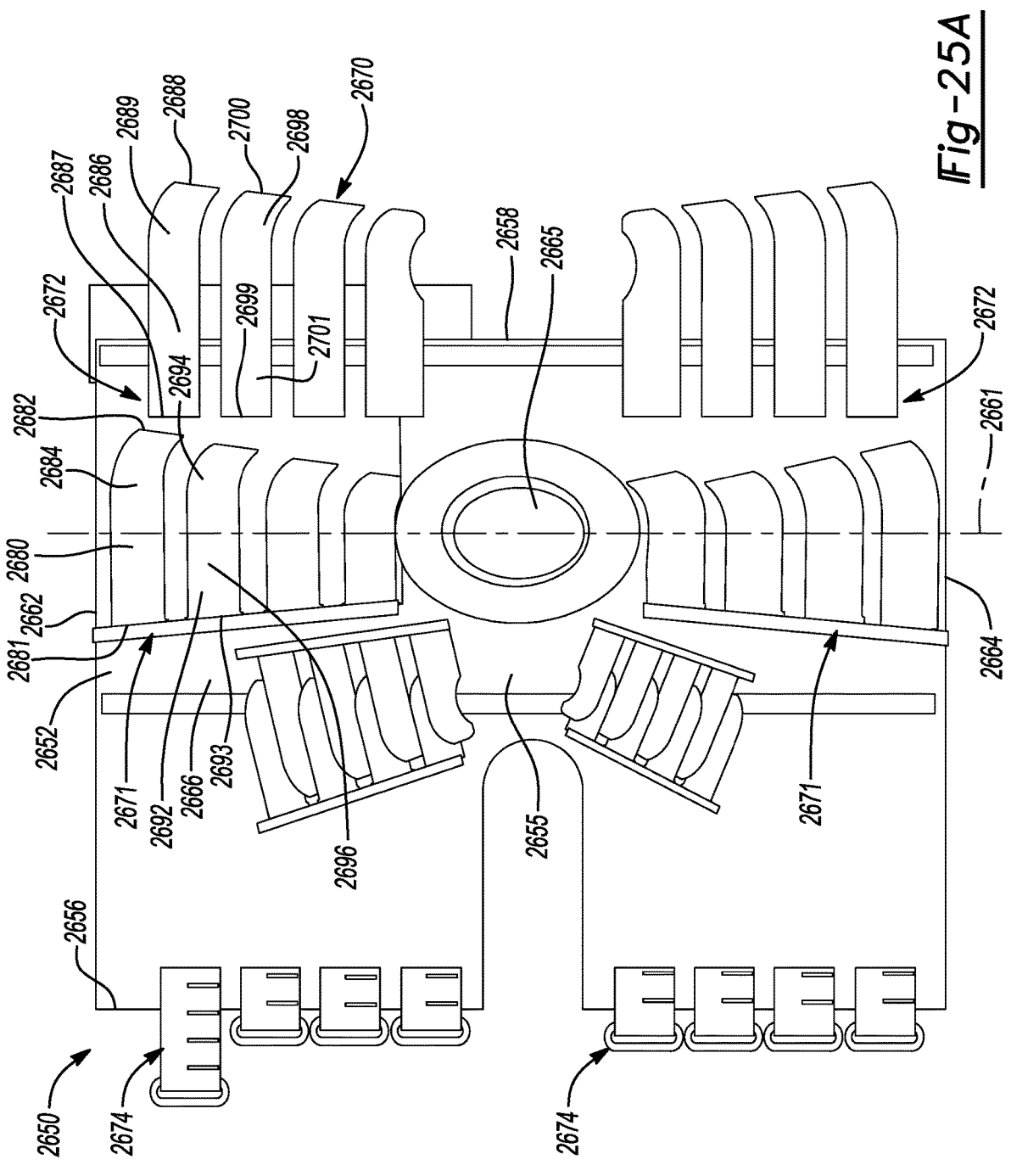
FIGS. 25A-25B show an enclosure including a closure system movable between a first position (FIG. 25A) and a second position (FIG. 25B) in accordance with the present disclosure.
Figure 25B:
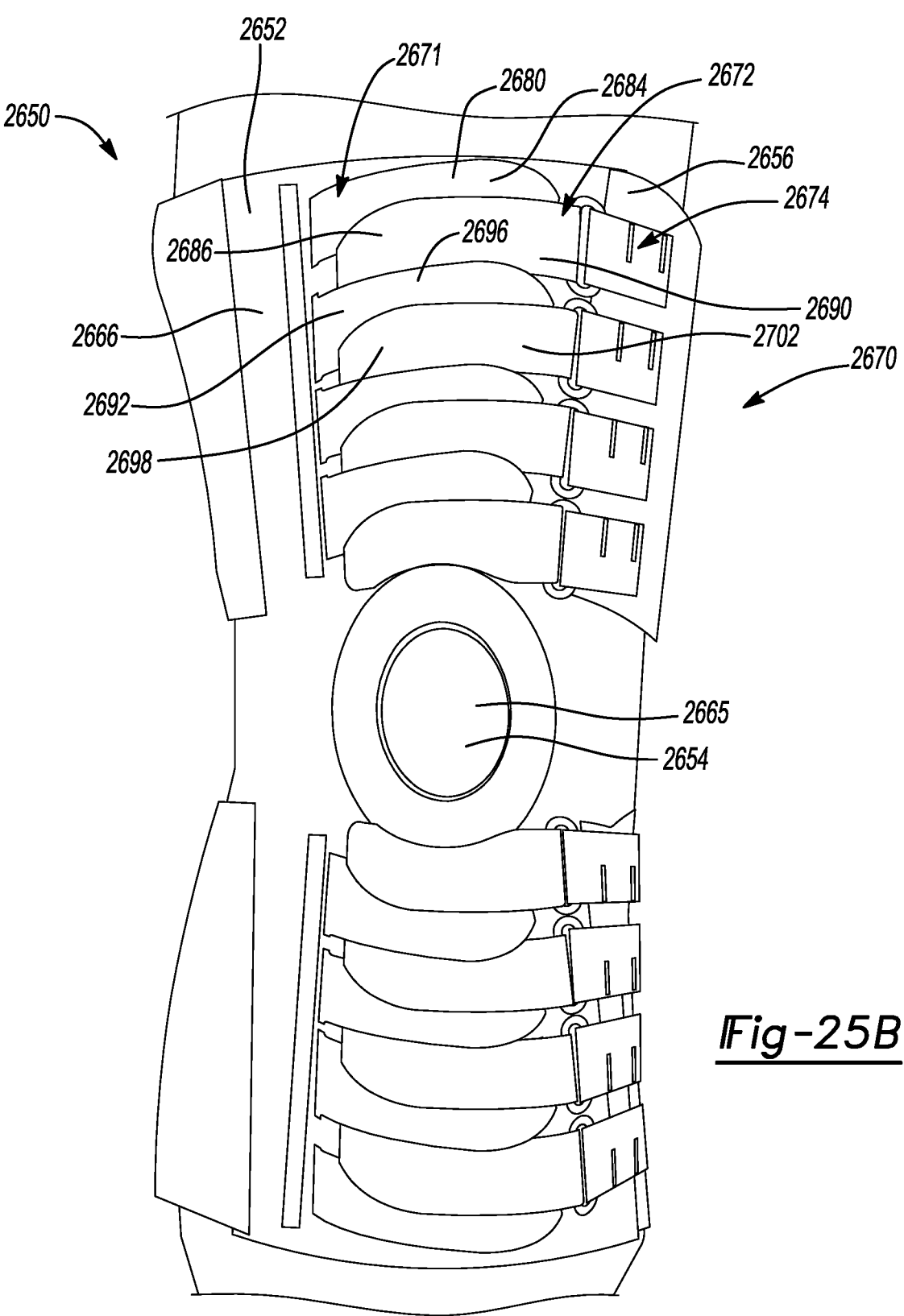

As discussed above, in some configurations, an enclosure may further include fasteners, such as hook and loop fasteners, integrated into the enclosure. With reference to FIGS. 25A-25B, an enclosure 2650 includes a flexible panel 2652. Flexible panel 2652 is moveable between a first or open position (FIG. 25A) and a second or closed position (FIG. 25B). In the first position, flexible panel 2652 is relatively flat. In the second position, flexible panel 2652 is adapted to cover a portion of an object. For example, in the second position, flexible panel 2652 may wrap around a knee 2554 covering all or a portion of a leg and knee 2654.

Flexible panel 2652 includes a body 2655 extending between a first panel edge 2656 and an opposite second panel edge 2658. First panel edge 2656 is spaced apart from second panel edge 2658. A first axis 2661 may extend in a first or longitudinal direction between a third panel edge 2662 and an opposite fourth panel edge 2664. Body 2655 may define an aperture 2665 extending therethrough. Flexible panel 2652 includes a first or exterior surface 2666 and an opposite second or interior surface (not shown).

Flexible panel 2652 further includes a closure system 2670. Closure system 2670 includes a first plurality of tabs 2671 extending from first surface 2666 of flexible panel 2652. First plurality of tabs 2671 are disposed on first surface 2666 between first panel edge 2656 and second panel edge 2658. First plurality of tabs 2671 may be substantially aligned in the first direction (i.e., first plurality of tabs 2671 is aligned in first direction parallel to axis 2661) and extend laterally outward in a second direction.

Closure system 2670 further includes a second plurality of tabs 2672 extending from first surface 2666 of flexible panel 2652. Second plurality of tabs 2672 are disposed on first surface 2666 between first plurality of tabs 2671 and second panel edge 2658. Second plurality of tabs 2672 may be substantially aligned in the first direction and extend laterally outward in second direction. Second plurality of tabs 2672 may be axially offset from first plurality of tabs 2671 such that in the second position (FIG. 25B), at least one of the first plurality of tabs 2671 and second plurality of tabs 2672 is adapted to simultaneously engage with two other adjacent tabs.

Flexible panel 2652 includes a plurality of anchors 2674 disposed on first panel edge 2656. Plurality of anchors 2674 are aligned with second plurality of tabs 2672 such that in the closed position (FIG. 25B), a portion of each tab of second plurality of tabs 2672 extends therethrough.

First plurality of tabs 2671 includes a first or starting tab 2680 including a first end 2681 disposed on flexible panel 2652 and extending to a first distal end 2682. First tab 2680 includes a first surface (not shown) and a second surface 2684 opposite first surface.

Second plurality of tabs 2672 includes a second tab 2686 including a second end 2687 disposed on flexible panel 2652 and extending to a second distal end 2688. Second tab 2686 includes a third surface 2689 (FIG. 25A) and a fourth surface 2690 (FIG. 25B) opposite third surface.

First plurality of tabs 2671 includes a third tab 2692 including a third end 2693 disposed on flexible panel 2652 extending to a third distal end 2694. Third tab includes a fifth surface (not shown) and a sixth surface 2696 opposite fifth surface.

Second plurality of tabs 2672 includes a fourth tab 2698 including a fourth end 2699 disposed on flexible panel 2652 and extending to a fourth distal end 2700. Fourth tab includes a seventh surface 2701 (FIG. 25A) and an eighth surface 2702 (FIG. 25B) opposite seventh surface.

In the second position (FIG. 25B), flexible panel 2652 is wrapped around user's leg such that second surface of flexible panel 2652 contacts user's knee 2654. First surface of first starting tab 2680 contacts first surface 2566 of flexible panel 2652. Second tab 2686 is wrapped or interlocked with first tab 2680 to contact at least a portion of first tab 2680. Specifically, third surface of second tab 2686 removably attaches to second surface 2684 of first tab 2680. Third tab 2692 is wrapped or interlocked with second tab 2686 to contact at least a portion of second tab 2686. Fifth surface of third tab 2692 removably attaches to fourth surface 2690 of second tab 2686. Fourth tab 2698 is wrapped or interlocked with third tab 2692. Seventh surface 2701 of fourth tab 2698 removably attaches to sixth surface 2696 of third tab 2692. The remaining of the first plurality of tabs 2671 and second plurality of tabs 2672 are similarly wrapped.

First plurality of tabs 2671 may include one of a plurality of hooks and a plurality of loops. Second plurality of tabs 2672 may include the other of the plurality of hooks and the plurality of loops. Specifically, second surface 2684 of first tab 2680 includes one of the plurality of hooks and plurality of loops and third surface 2689 of second tab 2686 includes the other of the plurality of hooks and the plurality of loops. Similarly, sixth surface 2696 of third tab 2692 includes one of the plurality of hooks and the plurality of loops and seventh surface 2701 of fourth tab 2698 includes the other of the plurality of hooks and the plurality of loops.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An enclosure for covering an outer surface of an object, comprising:

a flexible panel movable between a first position and a second position, wherein the flexible panel is adapted to be flat in the first position and to at least partially enclose the object in the second position, the flexible panel including, a first panel edge and a second panel edge spaced apart from the first panel edge, and a closure system including a plurality of tabs extending from each of the first and the second panel edges, wherein at least one of the plurality of tabs is adapted to simultaneously engage two other adjacent tabs, the plurality of tabs including, a first tab extending between a first end and a second end and including a first surface and a second surface opposite the first surface, wherein the first tab is positioned adjacent to the first panel edge at the first end, a second tab extending between a third end and a fourth end and including a third surface and a fourth surface opposite the third surface, wherein the second tab is positioned adjacent to the second panel edge at the third end, a third tab extending between a fifth end and a sixth end and including a fifth surface and a sixth surface opposite the fifth surface, wherein the third tab is positioned adjacent to the first panel edge at the fifth end, wherein in the second position, the third surface of the second tab is removably attached to the second surface of the first tab and the fourth surface of the second tab is removably attached to the fifth surface of the third tab, wherein the plurality of tabs further includes a locking tab having a seventh surface and an eighth surface opposite the seventh surface, wherein in the second position the seventh surface of the locking tab is removably attached to a surface of an adjacent tab and the eighth surface is uncovered by any other tabs, and the closure system interconnects the first and second panel edges.

2. The enclosure of claim 1, wherein a dimension between the first panel edge and the second panel edge is defined by a diameter of the object.

3. The enclosure of claim 1, wherein the first tab and the third tab are axially offset from the second tab.

4. The enclosure of claim 1, wherein the second end of the first tab is completely covered by the second tab and the fourth end of the second tab is completely covered by the third tab.

5. The enclosure of claim 1, wherein a portion of the second end of the first tab and the fourth end of the second tab remain uncovered by any other tabs.

6. The enclosure of claim 1, wherein the flexible panel includes one surface coated with an adhesive.

7. The enclosure of claim 1, wherein the flexible panel includes an aperture.

8. The enclosure of claim 7, wherein a portion of the object is adapted to extend through the aperture.

9. The enclosure of claim 1, wherein the flexible panel includes one or more structural supports.

10. The enclosure of claim 1, wherein the third surface of the second tab includes one of a plurality of hooks and a plurality of loops and the second surface of the first tab includes the other of the plurality of hooks and the plurality of loops.

11. The enclosure of claim 10, wherein the fourth surface of the second tab includes the other of the plurality of hooks and the plurality of loops.

12. An object including a closure system, the object comprising:

a first edge, a second edge, and the closure system including a plurality of tabs extending from each of the first edge and the second edge, wherein the closure system is moveable between a first position and a second position and is adapted to interconnect the first edge and the second edge in the second position, the plurality of tabs including, a first tab positioned adjacent to the first edge and including a first surface and a second surface opposite the first surface, a second tab positioned adjacent to the second edge and including a third surface and a fourth surface opposite the third surface, and a third tab positioned adjacent to the first edge and including a fifth surface and a sixth surface opposite the fifth surface, wherein in the second position, at least one of the plurality of tabs is adapted to simultaneously engage two other adjacent tabs, and the third surface of the second tab is removably attached to the second surface of the first tab and the fourth surface of the second tab is removably attached to the fifth surface of the third tab, the plurality of tabs further including a locking tab having a seventh surface and an eighth surface opposite the seventh surface, wherein in the second position the seventh surface of the locking tab is removably attached to a surface of an adjacent tab and the eighth surface is uncovered by any other tabs.

13. An enclosure for covering an outer surface of an object, comprising:

a flexible panel moveable between a first position and a second position, wherein the flexible panel is adapted to be flat in the first position and to enclose an object in the second position, the flexible panel including, a first panel edge and a second panel edge spaced apart from the first panel edge, and a closure system including, a first plurality of tabs extending from a surface of the flexible panel and a second plurality of tabs, the first plurality of tabs including, a first tab disposed on the surface of the flexible panel at a first end and including a first surface and a second surface opposite the first surface, and a second tab disposed on the surface of the flexible panel at a second end and including a third surface and a fourth surface opposite the third surface, the second plurality of tabs including a third tab including a fifth surface and a sixth surface opposite the fifth surface wherein in the second position, the fifth surface of the third tab is removably attached to the second surface of the first tab and the sixth surface of the third tab is removably attached to the third surface of the second tab, and the closure system interconnects the first and second panel edges, wherein the second plurality of tabs extend from the first panel edge, wherein the second plurality of tabs extend from the surface of the flexible panel and are axially offset from the first plurality of tabs, wherein a plurality of anchors are positioned adjacent to the first panel edge, the plurality of anchors are aligned with the second plurality of tabs, and in the second position, the second plurality of tabs are adapted to extend through the plurality of anchors, wherein the first plurality of tabs includes one of a plurality of hooks and a plurality of loops and the second plurality of tabs includes the other of the plurality of hooks and the plurality of loops, the second plurality of tabs further including a fourth tab including a seventh surface and an eighth surface opposite the seventh surface, wherein in the second position, the seventh surface of the fourth tab is removably attached to the fourth surface of the second tab, and the second surface of the first tab includes one of a plurality of hooks and a plurality of loops, the fifth surface of the third tab includes the other of the plurality of hooks and the plurality of loops, the fourth surface of the second tab includes one the plurality of hooks and the plurality of loops, and the seventh surface of the fourth tab includes the other of the plurality of hooks and the plurality of loops.

14. An enclosure for covering an outer surface of an object, comprising, a flexible panel movable between a first position and a second position, wherein the flexible panel is adapted to be flat in the first position and to at least partially enclose the object in the second position, the flexible panel including, a first panel edge and a second panel edge spaced apart from the first panel edge, and a closure system adapted including, a first plurality of tabs including a first tab extending between a first end and a second end and including a first surface and a second surface opposite the first surface, and a second tab extending between a third end and a fourth end and including a third surface and a fourth surface opposite the third surface, wherein the second tab is positioned adjacent to the second panel edge at the third end, wherein the first tab is positioned adjacent to the first panel edge at the first end, and wherein the second tab is positioned adjacent to the second panel edge at the third end, a second plurality of tabs including a third tab extending between a fifth end and a sixth end and including a fifth surface and a sixth surface opposite the fifth surface, and a fourth tab extending between a seventh end and an eighth end and including a seventh surface and an opposite eighth surface, wherein the third tab is positioned adjacent to the first panel edge at the fifth end, and wherein the fourth tab is positioned adjacent to the second panel edge at the seventh end, and and a locking tab positioned between the first plurality of tabs and the second plurality of tabs, the first tab and the third tab positioned at opposite axial ends of the flexible panel relative to the locking tab, wherein in the second position, the third surface of the second tab is removably attached to the second surface of the first tab and the seventh surface of the fourth tab is removably attached to the sixth surface of the third tab, and the closure system interconnects the first and second panel edges.

15. The enclosure of claim 14, wherein, the locking tab includes a ninth surface and an opposite tenth surface, in the second position the ninth surface of the locking tab is removably attached to an adjacent tab of both of the first plurality of tabs and the second plurality of tabs, and the eighth surface of the locking tab is uncovered by any other tabs.

* * * * *